US012153792B2

(12) United States Patent
Yang et al.

(10) Patent No.: US 12,153,792 B2
(45) Date of Patent: Nov. 26, 2024

(54) KEYBOARD DISPLAY METHOD, FOLDABLE-SCREEN DEVICE AND COMPUTER-READABLE STORAGE MEDIUM

(71) Applicant: HONOR DEVICE CO., LTD., Guangdong (CN)

(72) Inventors: Liu Yang, Shenzhen (CN); Hui Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/040,952

(22) PCT Filed: Aug. 31, 2022

(86) PCT No.: PCT/CN2022/116207
§ 371 (c)(1),
(2) Date: Feb. 7, 2023

(87) PCT Pub. No.: WO2023/040666
PCT Pub. Date: Mar. 23, 2023

(65) Prior Publication Data
US 2024/0302955 A1 Sep. 12, 2024

(30) Foreign Application Priority Data

Sep. 18, 2021 (CN) .......................... 202111111234.X

(51) Int. Cl.
*G06F 3/04886* (2022.01)
*G06F 3/0481* (2022.01)
(Continued)

(52) U.S. Cl.
CPC ........ *G06F 3/04886* (2013.01); *G06F 3/0481* (2013.01); *G06F 3/0486* (2013.01); *G06F 3/14* (2013.01); *G06F 2203/04803* (2013.01)

(58) Field of Classification Search
CPC .................................................. G06F 3/04886
See application file for complete search history.

(56) References Cited

U.S. PATENT DOCUMENTS 9,300,645 B1 3/2016 Rao et al.
10,116,786 B2 10/2018 Lee et al.
(Continued)

FOREIGN PATENT DOCUMENTS

CN 104699404 A 6/2015
CN 107526494 A 12/2017
(Continued)

OTHER PUBLICATIONS

CN 111669459 A (machine translation) (Year: 2024).*

*Primary Examiner* — Gustavo Polo
(74) *Attorney, Agent, or Firm* — Fish & Richardson P.C.

(57) ABSTRACT

This application relates to the field of electronic technologies, and provides a keyboard display method, a foldable-screen device, and a computer-readable storage medium. The method includes: displaying a first interface, where the first interface includes a first region and a second region, the first region is used to display an interface of a first app, the second region is used to display an interface of a second app, the first region includes a first input box of the first app, and the second region includes a second input box of the second app; when the first region and the second region are distributed from left to right, receiving a first operation performed by a user on the first input box, and displaying a keyboard region in the first region; receiving a second operation performed by the user on the second input box, displaying the keyboard region in the second region.

20 Claims, 30 Drawing Sheets

(51) Int. Cl.
    *G06F 3/0486*     (2013.01)
    *G06F 3/14*     (2006.01)

(56) References Cited

U.S. PATENT DOCUMENTS

| | | |
|---|---|---|
| 10,824,333 B2 | 11/2020 | Yang et al. |
| 2013/0069969 A1 | 3/2013 | Chang et al. |
| 2016/0364085 A1 | 12/2016 | Henderson et al. |
| 2019/0272095 A1 | 9/2019 | Leem et al. |
| 2021/0055854 A1 | 2/2021 | Fan et al. |
| 2023/0325214 A1* | 10/2023 | Bae .................... G06F 3/04886 |

FOREIGN PATENT DOCUMENTS

| | | |
|---|---|---|
| CN | 108519850 A | 9/2018 |
| CN | 109491738 A | 3/2019 |
| CN | 110471611 A | 11/2019 |
| CN | 111338555 A | 6/2020 |
| CN | 111669459 A | 9/2020 |
| CN | 111857532 A | 10/2020 |
| IN | 113986072 A | 1/2022 |

* cited by examiner

KEYBOARD DISPLAY METHOD, FOLDABLE-SCREEN DEVICE AND COMPUTER-READABLE STORAGE MEDIUM

CROSS-REFERENCE TO RELATED APPLICATIONS

This application is a National Stage of International Application No. PCT/CN2022/116027, filed on Aug. 31, 2022, which claims priority to Chinese Patent Application No. 202111111234.X, filed on Sep. 18, 2021. The aforementioned applications are hereby incorporated by reference in their entireties.

TECHNICAL FIELD

This application relates to the field of electronic technologies, and specifically, to a keyboard display method, a foldable-screen device and a computer-readable storage medium.

BACKGROUND

As common terminal devices, foldable-screen devices have advantages of large screen sizes and good display effects, and therefore are more widely used by people.

Usually, when people use foldable-screen devices, after a keyboard application is started, a keyboard region is displayed on a lower position of a screen for use. A user may tap a key in the keyboard region for input. If the user needs to edit when two applications (application, app) are displayed in a split-screen form, the foldable-screen device starts the keyboard application and displays the keyboard region on a lower position of the entire screen.

When two applications are displayed in a split-screen form, displaying the keyboard region on the lower position of the entire screen may obstruct interfaces of the two apps, which hinders the user from viewing the screen, resulting in poor user experience.

SUMMARY

This application provides a keyboard display method, an apparatus, a chip, a foldable-screen device, a computer-readable storage medium, and a computer program, to reduce an area of a screen obstructed by a keyboard, thereby improving user experience.

According to a first aspect, a keyboard display method is provided, applied to a foldable-screen device and including: displaying a first interface, where the first interface includes a first region and a second region, the first region is used to display an interface of a first app, the second region is used to display an interface of a second app, the first region includes a first input box of the first app, and the second region includes a second input box of the second app: when the first region and the second region are distributed from left to right, receiving a first operation performed by a user on the first input box, where the first operation is used to determine that an input cursor is located in the first input box: displaying a keyboard region in the first region in response to the first operation, receiving a second operation performed by the user on the second input box, where the second operation is used to determine that the input cursor is located in the second input box; and in response to the second operation, displaying the keyboard region in the second region, and stopping displaying the keyboard region in the first region.

The foregoing first interface may be an interface of vertical split-screen display of the first app and the second app. In the first interface, the first region on a left side of a screen may display the interface of the first app, and the second region on a right side of the screen may display the interface of the second app. It should be noted that the first region may alternatively be located on the right side of the screen, and the second region may alternatively be located on the left side of the screen. When the user taps on the first input box, it indicates that an intention of the user is to enter text in the first input box. In this case, the foldable-screen device starts a keyboard application and displays the keyboard region on a lower position of the first region. When the user taps on the second input box, it indicates that an intention of the user is to enter text in the second input box. In this case, the foldable-screen device displays the keyboard region on a lower position of the second region, the keyboard region is no longer displayed in the first region.

Compared with a conventional manner of displaying a keyboard region on a lower position of an entire screen, the manner of displaying a keyboard region in a region of a corresponding app in the foregoing method occupies a smaller area of the screen. When the user enters text for an app, a position of the keyboard region does not affect a display interface of another app. For example, when the user enters text in an interface of a chat app, a video play interface of a video app is not obstructed by the keyboard region, and the user can watch the video play interface completely, thereby improving user experience.

Optionally, the method further includes: receiving a third operation performed by the user on a third app, where the third operation is used to open the third app; displaying the third region in the form of a floating window in response to the third operation, where the third region is used to display an interface of the third app, and the third region includes a third input box of the third app; receiving a fourth operation performed on the third input box, where the fourth operation is used to determine that the input cursor is located in the third input box; and displaying the keyboard region in the form of a floating window in response to the fourth operation.

When needing to use the third app, the user may perform the third operation of opening the third app. For example, when the user uses the first app and the second app in a vertical split-screen form, the third app receives a notification message, and the notification message pops up on an upper position of the screen in the form of a banner notification. If the user wants to view the received notification message, the user may tap on a window of the banner notification to open the third app so as to view the notification message. In this case, the foldable-screen device may display the interface of the third app in the form of a floating window. For another example, alternatively, the user may slide leftward from a right side of the screen and then pause to pull out a sidebar, and then tap an icon of the third app in the sidebar to open the third app. The interface of the third app may be displayed in the form of a floating window. Herein, a region in which the interface of the third app is distributed is used as the third region. If the interface of the third app with a floating window is displayed, when the user taps on the first input box, the keyboard region can be displayed on a lower position the first region, or when the user taps on the second input box, the keyboard region can be displayed on a lower position of the second region. When the user taps on the third input box of the third application in the third region, it indicates that an intention of the user is to enter text in the third input box. In this case, the foldable-screen device starts the keyboard application and displays the keyboard region in the form of a floating window. In this method, for a same display object, a form of displaying a floating window occupies a smaller area than a form of displaying a non-floating window. In this method, displaying the keyboard region in the form of a floating window occupies a smaller area of the screen when compared a conventional manner of displaying the keyboard region on a lower position of the entire screen. In addition, if the interface of the third app with a floating window is displayed, for input for different apps, differentiated display of the keyboard region can improve recognition of the user on a position of the input cursor, which is convenient for the user to identify which app the input is currently performed for, thereby improving user experience.

Optionally, when the third region is located on an upper position of the second region, the keyboard region is vertically adjacent to the third region and the keyboard region is located on a lower position of the second region. Most users are accustomed to an operation region located on a lower position of a display region, which is convenient for the user to input when holding a terminal device. The manner of displaying the keyboard region in this method can help the user recognize that the keyboard region displayed in a floating manner is input for the app displayed in a floating manner, and further it is convenient for the user to operate the keyboard region. Therefore, this manner is more appropriate.

Optionally, the method further includes: when the foldable-screen device satisfies a preset condition, displaying a second interface, where the second interface includes the first region and the second region, and the preset condition is a condition of satisfying horizontal split-screen display of the first app and the second app: when the first region and the second region are distributed from top to bottom, receiving a fifth operation performed by the user on the first input box, where the fifth operation is used to determine that the input cursor is located in the first input box; displaying the keyboard region in the second region in response to the fifth operation; receiving a sixth operation performed by the user on the second input box, where the sixth operation is used to determine that the input cursor is located in the second input box; and in response to the sixth operation, displaying the keyboard region in the second region, and stopping displaying the keyboard region in the first region.

When the user wants to display interfaces of two apps in a horizontal split-screen form, the user may operate the screen of the foldable-screen device, so that the interfaces of the two apps are displayed on a horizontal split-screen form. For example, after opening an app, the user drags an icon of the second app from the sidebar to a lower position of the screen. In this case, the foldable-screen device satisfies the preset condition, and two apps can be displayed in a horizontal split-screen form. In this case, the foldable-screen device may display the interface of the first app in the first region on an upper position of the screen and display the interface of the second app in the second region on a lower position of the screen, to form the second interface. If the user taps on the first input box, that is, performs the fifth operation, it can be determined that currently a character needs to be entered into the first input box. Alternatively, if the user taps on the second input box, that is, performs the sixth operation, it can be determined that currently a character needs to be entered into the second input box. The foldable-screen device can display the keyboard region in the second region for both cases, but does not display the keyboard region in the first region. Usually when a person holds a foldable-screen device, the person is accustomed to holding it at a lower end of the foldable-screen device. Therefore, regardless of which app the input is performed for, the keyboard region is displayed in the second region on the lower position of the screen, so that it is convenient for an input operation if the user holds the foldable-screen device, thereby improving user experience.

Optionally, the keyboard region is located on a right side of the second region. Displaying the keyboard region on the right side of the second region can avoid a part of the interface of the second app for display, which can avoid excessively obstructing the screen, thereby improving user experience.

Optionally, the method further includes: receiving a seventh operation performed by the user on a third app, where the seventh operation is used to open the third app; displaying the third region in the form of a floating window in response to the seventh operation, where the third region is used to display an interface of the third app, and the third region includes a third input box of the third app; receiving an eighth operation performed on the third input box, where the eighth operation is used to determine that the input cursor is located in the third input box; and displaying the keyboard region in the form of a floating window in response to the eighth operation.

When the foldable-screen device displays interfaces of two apps in a horizontal split-screen form, if the user needs to use the third app, the user may perform the seventh operation of opening the third app. For a form of performing the seventh operation by the user, refer to the foregoing description of the third operation. Details are not described herein again. The interface of the third app may be displayed in the form of a floating window. Herein, a region in which the interface of the third app is distributed is used as the third region. If the interface of the third app with a floating window is displayed, when the user taps on the first input box, the keyboard region can be displayed on the second region, or when the user taps on the second input box, the keyboard region can be displayed on the second region. When the user taps on the third input box in the third region, it indicates that an intention of the user is to enter text in the third input box. In this case, the foldable-screen device starts the keyboard application and displays the keyboard region in the form of a floating window. For a same display object, a form of displaying a floating window occupies a smaller area than a form of displaying a non-floating window. In this method, displaying the keyboard region in the form of a floating window occupies a smaller area of the screen when compared a conventional manner of displaying the keyboard region on a lower position of the entire screen. In addition, if the interface of the third app with a floating window is displayed, for input for different apps, differentiated display of the keyboard region can improve the user's recognition of a position of the input cursor, which is convenient for the user to identify which app the input is currently performed for, thereby improving user experience.

Optionally, if the first region is located on an upper position of the screen, and the second region is located on a lower position of the screen, when the third region is located on a right side of the first region, the keyboard region is vertically adjacent to the third region and the keyboard region is located on the right side of the second region. In this display manner, when the third region is located in the first region, a height of an original third region needs to be reduced to avoid the keyboard region, so that the keyboard region can be completely displayed in the interface. In addition, when the third region is located on the right side of the first region and the keyboard region is located on the right side of the second region, obstruction of the screen can be reduced while facilitating input of the user, thereby improving user experience.

Optionally, when the third region is located on a left side of the second region, the keyboard region is horizontally adjacent to the third region and the keyboard region is located on the right side of the second region. Optionally, the user may further drag the floating window to adjust a display position of the floating window. For example, when the first app is a video app and the user needs to watch a video play interface all the time, the third region can be dragged from the first region to the left side of the second region to avoid the video play interface. In this case, if the user needs to enter text in the third input box, the keyboard region can be displayed on the right side of the second region, so as to satisfy a requirement of the user for watching a video, thereby improving user experience.

Optionally, the displaying a first interface includes: displaying a main interface, where the main interface includes an icon of the first app and an icon of the second app; receiving a ninth operation performed by the user on the first app, where the ninth operation is used to open the first app; receiving a tenth operation performed by the user, where the tenth operation is used to open a sidebar, a list of a plurality of apps is displayed on the sidebar, and the plurality of apps include the second app; receiving an eleventh operation performed by the user on the second app on the sidebar, where the eleventh operation is used to open the second app in a split-screen form; and displaying the first interface.

The main interface may be a desktop of the foldable-screen device, including icons of a plurality of apps. The user can operate the main interface to first operate the icon of the first app to open the first app, and then operate the icon of the second app, so that the interfaces of the first app and the second app are displayed in a vertical split-screen form, thereby displaying the first interface. An operation manner in this method can achieve vertical split-screen display of two apps, which is convenient for the user to use the two apps at the same time, and avoids inconvenience caused by repeatedly switching between the interfaces of the apps.

Optionally, the tenth operation is an operation of sliding from a side edge of the screen toward the middle of the screen and then pausing.

Optionally, the eleventh operation is an operation of dragging the icon of the second app from the sidebar to a left side of the screen or a right side of the screen.

Optionally, the user may tap the icon of the first app on the main interface to open the first app, then slide from the left or right side of the screen to the middle of the screen and pause to pull out the sidebar, and then drag the icon of the second app in the sidebar to the left or right side of the screen to open the first interface. An operation manner in this method can achieve vertical split-screen display of two apps, which is convenient for the user to use the two apps at the same time, and avoids inconvenience caused by repeatedly switching between the interfaces of the apps. A combination of the tenth operation and the eleventh operation can achieve vertical split-screen display of two apps, which is convenient for the user to use the two apps at the same time, and avoids inconvenience caused by repeatedly switching between the interfaces of the apps. In addition, such an operation manner is easier for users to grasp and more convenient to operate than a manner of opening a split-screen mode from a settings interface and then selecting different apps for different display regions for split-screen display.

Optionally, the user may tap the icon of the first app on the main interface to open the first app, then slide from the left or right side of the screen to the middle of the screen and pause to pull out the sidebar, and then drag the icon of the second app in the sidebar to an upper position or a lower position of the screen to open the second interface. In this case, the foldable-screen device displays the second interface.

Optionally, the first app is a video play app, and the interface of the first app is a video play interface.

Optionally, the first app is a conference app, and the interface of the first app is an interface of a participant attendance status.

Optionally, the second app is a chat app, and the interface of the second app is a chat interface.

If the user is using a conference app to participate in a conference, that is, an interface of the conference app is an interface of a participant attendance status, the foregoing method can make the keyboard region not obstruct or less obstruct the interface of the participant attendance status, so as to ensure that a conference of the user is not affected by use of another app such as a chat app by the user, thereby improving user experience.

If the user is using a video play app to play a video and an interface of the video play app is an interface of playing a video, the foregoing method can make the keyboard region not obstruct or less obstruct the video play interface, so as to ensure that video watching by the user, such as live video watching, is not affected by use of another app by the user, thereby improving user experience.

Optionally, the second app is a payment app, and the interface of the second app is a payment interface.

If the user needs to use the payment app for shopping when using the first app, the foregoing method can make a pop-up keyboard region for entering an amount or a password during a payment process not obstruct or less obstruct the interface of the first app, thereby improving user experience.

According to a second aspect, a keyboard display method is provided, applied to a foldable-screen device and including:

displaying a main interface, where the main interface includes an icon of a first app and an icon of a second app;

receiving a ninth operation performed by a user on the first app, where the ninth operation is used to open the first app;

receiving a tenth operation performed by the user, where the tenth operation is an operation of sliding from a side edge of a screen toward the middle of the screen and then pausing to open a sidebar, a list of a plurality of apps is displayed on the sidebar, and the plurality of apps include the second app;

receiving an eleventh operation performed by the user on the second app on the sidebar, where the eleventh operation is an operation of dragging the icon of the second app from the sidebar to a left side of the screen or a right side of the screen;

displaying a first interface, where the first interface includes a first region and a second region, the first region is used to display an interface of the first app, the second region is used to display an interface of the second app, the first region includes a first input box of the first app, and the second region includes a second input box of the second app; when the first app is an app for playing a video, the interface of the first app is a video play interface, or when the first app is a conference app, the interface of the first app is an interface of a participant attendance status; and when the second app is a chat app, the interface of the second app is a chat interface, or when the second app is a payment app, the interface of the second app is a payment interface;

when the first region and the second region are distributed from left to right, receiving a first operation performed by the user on the first input box, where the first operation is used to determine that an input cursor is located in the first input box;

displaying a keyboard region in the first region in response to the first operation;

receiving a second operation performed by the user on the second input box, where the second operation is used to determine that the input cursor is located in the second input box; and in response to the second operation, displaying the keyboard region in the second region, and stopping displaying the keyboard region in the first region;

receiving a third operation performed by the user on a third app, where the third operation is used to open the third app;

displaying the third region in the form of a floating window on an upper position of the second region in response to the third operation, where the third region is used to display an interface of the third app, and the third region includes a third input box of the third app;

receiving a fourth operation performed on the third input box, where the fourth operation is used to determine that the input cursor is located in the third input box;

displaying the keyboard region in the form of a floating window on a lower position of the second region in response to the fourth operation, where the keyboard region is vertically adjacent to the third region;

when the foldable-screen device satisfies a condition of horizontal split-screen display of the first app and the second app, displaying a second interface, where the second interface includes the first region and the second region;

when the first region and the second region are distributed from top to bottom and the first region is located on the upper position of the second region, receiving a fifth operation performed by the user on the first input box, where the fifth operation is used to determine that the input cursor is located in the first input box;

displaying the keyboard region on a right side of the second region in response to the fifth operation;

receiving a sixth operation performed by the user on the second input box, where the sixth operation is used to determine that the input cursor is located in the second input box;

displaying the keyboard region on a right side of the second region in response to the sixth operation;

receiving a seventh operation performed by the user on the third app, where the seventh operation is used to open the third app;

displaying the third region in the form of a floating window in response to the seventh operation;

receiving an eighth operation performed on the third input box, where the eighth operation is used to determine that the input cursor is located in the third input box; and displaying the keyboard region in the form of a floating window in response to the eighth operation, where when the third region is located on the right side of the first region, the keyboard region is vertically adjacent to the third region and the keyboard region is located on the right side of the second region; or when the third region is located on a left side of the second region, the keyboard region is horizontally adjacent to the third region and the keyboard region is located on the right side of the second region.

According to a third aspect, a keyboard display apparatus is provided, including a unit that includes software and/or hardware. The unit is configured to perform any one of the methods in the technical solutions described in the first aspect or the second aspect.

According to a fourth aspect, a foldable-screen device is provided. The foldable-screen device includes: a processor, a memory, an interface, and a foldable screen. The processor, the memory, and the interface cooperate with each other, so that the foldable-screen device performs any one of the methods in the technical solutions described in the first aspect or the second aspect.

According to a fifth aspect, a chip is provided, including a processor. The processor is configured to read and execute a computer program stored in a memory, to implement any one of the methods in the technical solutions described in the first aspect or the second aspect.

Optionally, the chip further includes the memory, and the memory is connected to the processor through a circuit or a line.

Further, optionally, the chip further includes a communications interface.

According to a sixth aspect, a computer-readable storage medium is provided. The computer-readable storage medium stores a computer program, and when the computer program is executed by a processor, the processor is enabled to perform any one of the methods in the technical solutions described in the first aspect or the second aspect.

According to a seventh aspect, a computer program product is provided. The computer program product includes computer program code, and when the computer program code is run on a foldable-screen device, the foldable-screen device is enabled to perform any one of the methods in the technical solutions described in the first aspect or the second aspect.

DESCRIPTION OF EMBODIMENTS

The following describes the technical solutions in the embodiments of this application with reference to the accompanying drawings in the embodiments of this application. In the description of the embodiments of this application, unless otherwise specified, "/" indicates that an "or" relationship. For example, A/B may represent A or B. "and/or" in this specification is merely an association relationship for describing associated objects, and represents that three relationships may exist. For example, A and/or B may represent the following three cases: Only A exists, both A and B exist, and only B exists. In addition, in the description of the embodiments of this application, "a plurality of" means "two or more".

In the following, the terms "first", "second", "third" . . . , and "eleventh" are used merely for descriptive purposes, and cannot be understood as indicating or implying relative importance or implicitly indicating the quantity of indicated technical features. Therefore, a feature limited by "first", "second", "third" . . . or "eleventh" may expressly or implicitly include one or more of such features.

A keyboard display method applied to a foldable-screen device and provided in the embodiments of this application may be applied to a terminal device such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the terminal device is not limited in the embodiments of this application.

Figure 1:
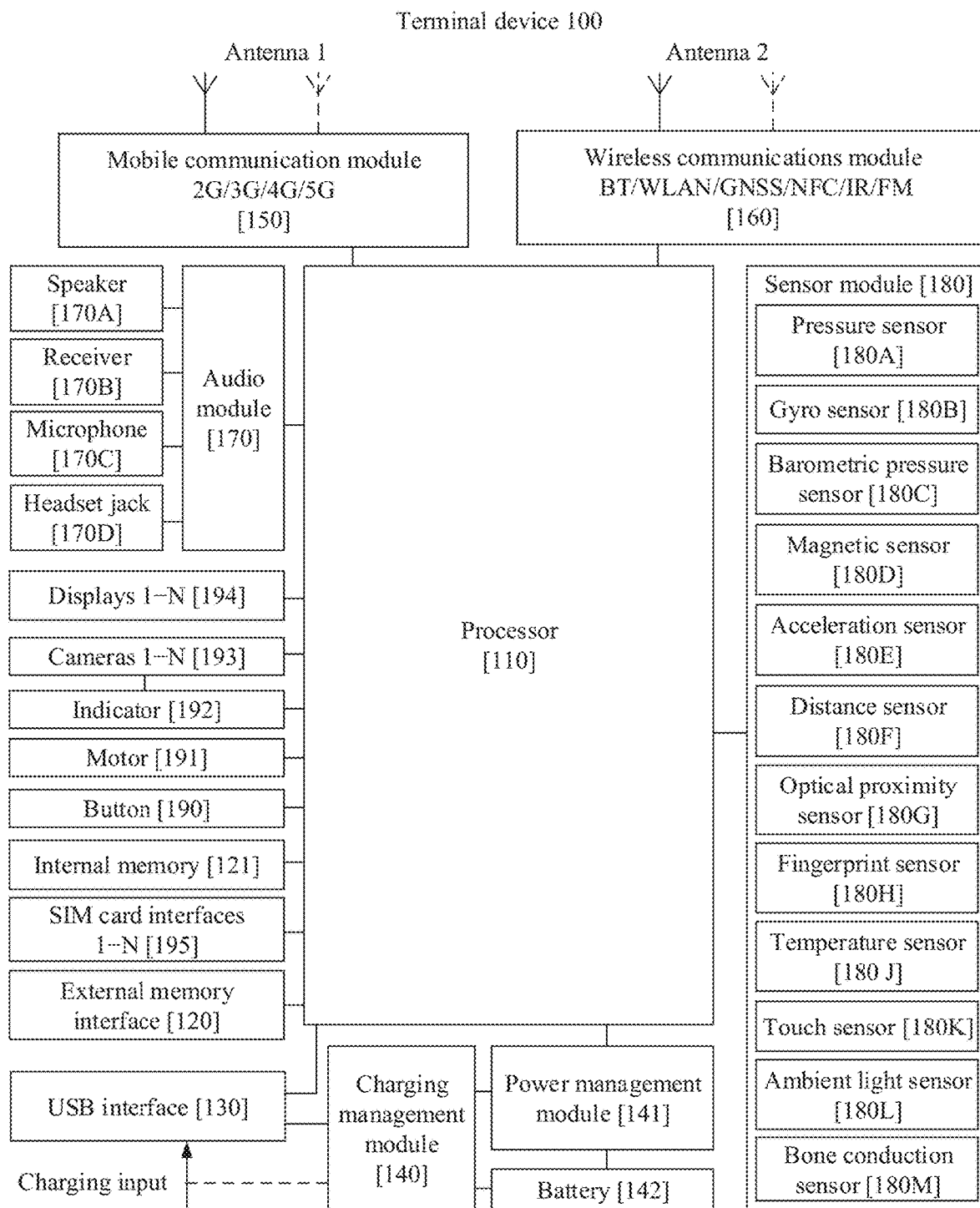
FIG. 1 is a schematic diagram of a structure of a terminal device 100 according to an embodiment of this application.

For example, FIG. 1 is a schematic diagram of a structure of a terminal device 100 according to an embodiment of this application. The terminal device 100 may include a processor 110, an external memory interface 120, an internal memory 121, a universal serial bus (universal serial bus. USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, and an ambient light sensor 180L, a bone conduction sensor 180M, and the like.

It may be understood that a structure shown in this embodiment of this application does not constitute a specific limitation on the terminal device 100. In some other embodiments of this application, the terminal device 100 may include more or fewer components than those shown in the figure, or some components may be combined, or some components may be split, or a different component arrangement may be used. The components shown in the figure may be implemented in hardware, software, or a combination of software and hardware.

A wireless communication function of the terminal device 100 may be implemented through the antenna 1, the antenna 2, the mobile communication module 150, the wireless communication module 160, the modem processor, the baseband processor, and the like.

The terminal device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display. LCD), an organic light-emitting diode (organic light-emitting diode. OLED), an active-matrix organic light emitting diode (active-matrix organic light emitting diode, AMOLED), a flexible light-emitting diode (flexible light-emitting diode. FLED), a mini-LED, a micro-LED, a micro-OLED, a quantum dot light emitting diode (quantum dot light emitting diodes, QLED), or the like. In some embodiments, the terminal device 100 may include one or N displays 194, where N is a positive integer greater than 1.

The terminal device 100 may implement a shooting function through the ISP, the camera 193, the video codec, the GPU, the display 194, the application processor, and the like.

The ISP is configured to process data fed back by the camera 193. For example, during photographing, a shutter is opened, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on image noise, brightness, and a skin tone. The ISP can further optimize parameters such as exposure and a color temperature in a shooting scenario. In some embodiments, the ISP may be disposed in the camera 193.

The camera 193 is configured to capture a still image or a video. An optical image of an object is generated through the lens, and is projected onto a photosensitive element. The light-sensitive element may be a charge coupled device (charge coupled device, CCD) or a complementary metal-oxide-semiconductor (complementary metal-oxide-semiconductor. CMOS) phototransistor. The photosensitive element converts an optical signal into an electrical signal, and then transmits the electrical signal to the ISP to convert it into a digital image signal. The ISP outputs the digital image signal to the DSP for processing. The DSP converts the digital image signal into an image signal in a format such as standard RGB or YUV. In some embodiments, the terminal device 100 may include one or N cameras 193, where N is a positive integer greater than 1.

The external memory interface 120 may be configured to connect to an external memory card, for example, a micro SD card, to extend a storage capability of the terminal device 100. The external memory card communicates with the processor 110 by using the external memory interface 120, to implement a data storage function. For example, files such as music and videos are stored in the external storage card.

The internal memory 121 may be configured to store computer executable program code, where the executable program code includes instructions. The executable program code includes instructions. The processor 110 performs various function applications and data processing of the terminal device 100 by running the instructions stored in the internal memory 121. The internal memory 121 may include a program storage area and a data storage area. The program storage area may store an operating system, an application required for at least one function (such as a sound play function and an image play function), and the like. The data storage area may store data (such as audio data and a phone book) created during use of the terminal device 100, and the like. In addition, the internal memory 121 may include a high-speed random access memory, and may further include a non-volatile memory, for example, at least one magnetic disk storage device, a flash memory device, and a universal flash storage (universal flash storage, UFS).

The terminal device 100 may implement an audio function such as music play and recording through the audio module 170, the speaker 170A, the receiver 170B, the microphone 170C, the headset jack 170D, the application processor, and the like.

A software system of the terminal device 100 may use a layered architecture, an event-driven architecture, a micro-kernel architecture, a micro service architecture, or a cloud architecture. In this embodiment of this application, an Android system of a layered architecture is used as an example to describe the software structure of the terminal device 100.

Figure 2:
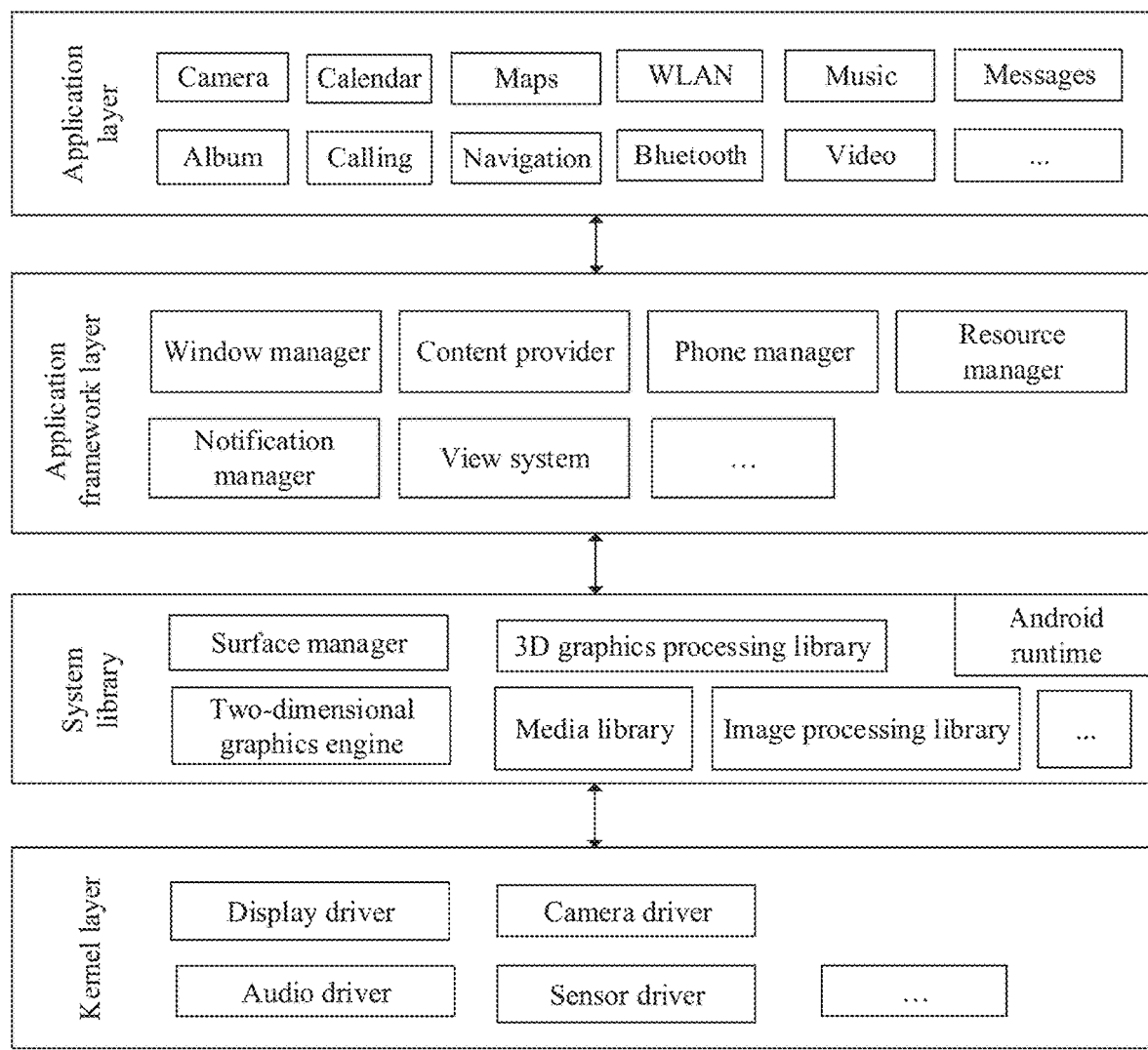
FIG. 2 is a block diagram of a software structure of a terminal device 100 according to an embodiment of this application.

FIG. 2 is a block diagram of a software structure of a terminal device 100 according to an embodiment of this application. Software is divided into several layers by using the layered architecture, and each layer has a clear role and task. The layers communicate with each other by using a software interface. In some embodiments, the Android system is divided into four layers; an application layer, an application framework layer, an Android runtime (Android runtime) and system library layer, and a kernel layer from top down. The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (application programming interface.

API) and a programming framework for application programs at the application layer. The application framework layer includes some predefined functions.

As shown in FIG. 2, the application framework layer may include a window manager, a content provider, a view system, a phone manager, a resource manager, a notification manager, and the like.

The window manager is used to manage a window program. The window manager may obtain a display size, determine whether there is a status bar, lock a screen, take a screenshot, and the like.

The content provider is used to store and obtain data, and enables these data to be accessible to an application. The data may include a video, an image, audio, calls that are made and received, browsing history and bookmarks, a phonebook, and the like.

The view system includes visual controls, such as a control for displaying text, a control for displaying pictures, and the like. The view system may be used to construct an application. A display interface may include one or more views. For example, a display interface including a message notification icon may include a view for displaying text and a view for displaying pictures.

The phone manager is configured to provide a communication function of the terminal device 100, for example, management of a call status (including answering, declining, or the like).

The resource manager provides resources for applications, such as localized strings, icons, images, layout files, and video files.

The notification manager enables an application to display notification information in the status bar, which can be used to convey a notification-type message, and can automatically disappear after a short stay without user interaction. For example, the notification manager is used for notifying download completion or as a message reminder. The notification manager may alternatively be a notification that appears in the status bar at the top of the system in the form of a chart or scroll bar text, such as a notification for an application running in the background, or a notification that appear on the screen in the form of a dialog window. For example, text information is displayed in the status bar, an announcement is given, the terminal device vibrates, or an indicator light blinks.

The Android runtime includes a kernel library and a virtual machine. The Android runtime is responsible for scheduling and management of the Android system.

The kernel library includes two parts: one part is a function that needs to be invoked by a Java language, and the other part is a kernel library of Android.

The application layer and the application framework layer run on a virtual machine. The virtual machine executes java files at the application layer and the application framework layer as binary files. The virtual machine is configured to implement functions such as object lifecycle management, stack management, thread management, security and exception management, and garbage collection.

The system library may include a plurality of function modules such as, a surface manager (surface manager), a media library (media libraries), a three-dimensional graphics processing library (for example. OpenGL ES), and a 2D graphics engine (for example, SGL).

The surface manager is configured to manage a display subsystem and provide fusion of 2D and 3D layers for a plurality of applications.

The media libraries support multiple common audio and video formats for playback and recording, as well as static image files. The media libraries may support a variety of audio and video encoding formats, such as MPEG4, H.264, MP3, AAC, AMR, JPG, PNG, and the like.

The three-dimensional graphics processing library is configured to implement three-dimensional graphics drawing, image rendering, composition, layer processing, and the like.

The 2D graphics engine is a graphics engine for 2D graphics.

The kernel layer is a layer between hardware and software. The kernel layer includes at least a display driver, a camera driver, an audio driver, and a sensor driver.

For ease of understanding, the following embodiments of this application uses the terminal device having the structure shown in FIG. 1 and FIG. 2 as an example to describe, in detail with reference to the accompanying drawings and application scenarios, a keyboard display method provided in embodiments of this application. The foregoing terminal device may be a foldable-screen device related to the embodiments of this application. The following uses the foldable-screen device as an execution body to describe in detail the technical solutions of this application. It should be noted that the directions "upper", "lower", "left", and "right" in the embodiments of this application are directions "upper", "lower", "left", and "right" that are perceived by a user when the user faces a screen of the foldable-screen device. For example, a right side of the screen is a direction of approaching the right side of the user in the screen when the user faces the screen of the foldable-screen device. For another example, an upper position of the screen is a direction of approaching an upper position of the user in the screen when the user faces the screen of the foldable-screen device.

Figure 3:
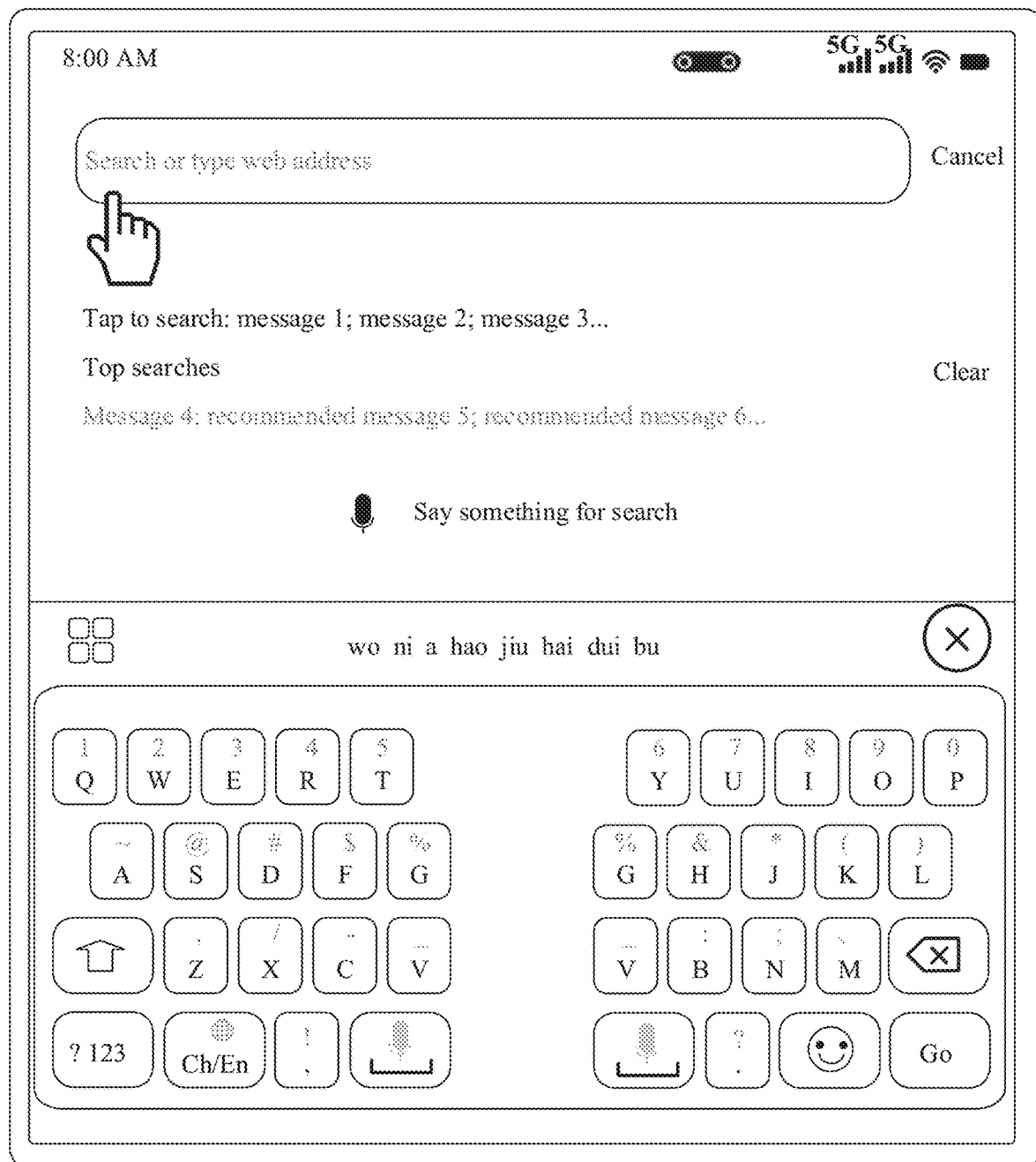
FIG. 3 is a schematic diagram of an example interface of displaying a keyboard region when a single application is displayed according to an embodiment of this application.
Figure 4:
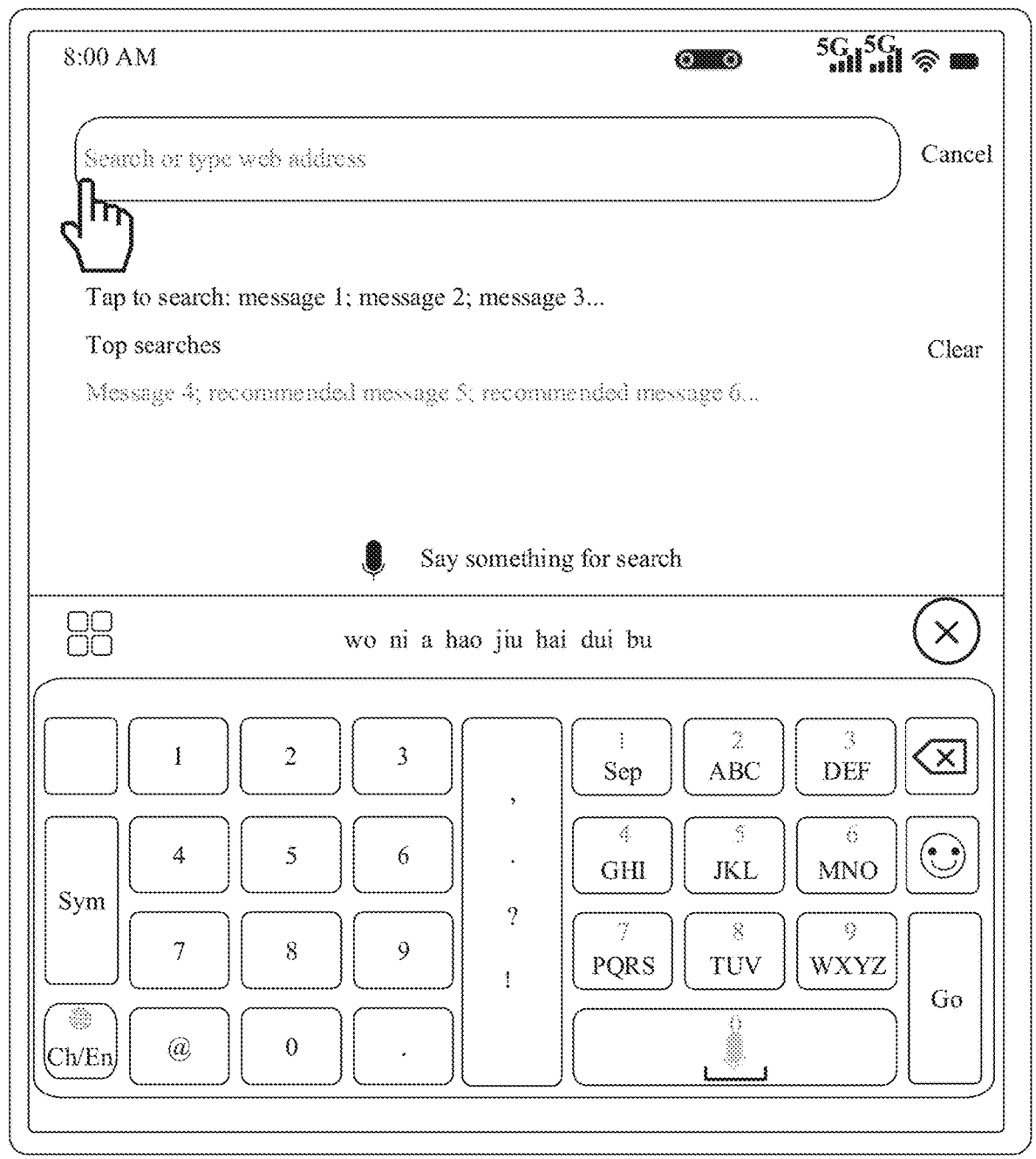
FIG. 4 is a schematic diagram of another example interface of displaying a keyboard region when a single application is displayed according to an embodiment of this application.

When an interface of the foldable-screen device separately displays an interface of a single app, if the user taps an input box of the app to start a keyboard application, a keyboard region may be displayed on a lower position of the screen, as shown in FIG. 3. In FIG. 3, an example in which the keyboard region displays the form of a QWERTY keyboard is shown. When the keyboard region is displayed in the form of a QWERTY keyboard, a blank region can be set in the middle of the keyboard region, as shown in FIG. 3. This blank region can separate keys in the keyboard from left to right, so that some keys are close to the left side of the screen, and other keys are close to a right side of the screen. In such a display manner, when the user holds the foldable-screen device with both hands, some keys are closer to the left hand, and other buttons are closer to the right hand, to avoid operation inconvenience caused due to that keys are located in the middle of the screen and consequently are far away from the left and right hands. Therefore, it is convenient for the user to use the keyboard for input, thereby improving user experience. In some embodiments, the keyboard region may alternatively be displayed in the form of 9-key Pinyin. For example, in an interface shown in FIG. 4, the foldable-screen device may display some punctuation keys in the middle of the keyboard region from top to bottom, display number keys on the left side of the screen, and display letter keys on the right side of the screen. When the user holds the foldable-screen device with both hands, the left hand is closer to the number keys, and the right hand is closer to the letter keys. Because the punctuation keys are used less frequently than the number keys and letter keys, in most cases, the user can implement tapping more easily when tapping keys, and it is more convenient to operate, thereby improving user experience.

Figure 5:
FIG. 5 is a schematic diagram of an example interface of displaying a keyboard region when a single application is displayed according to an embodiment of this application.
Figure 6A:
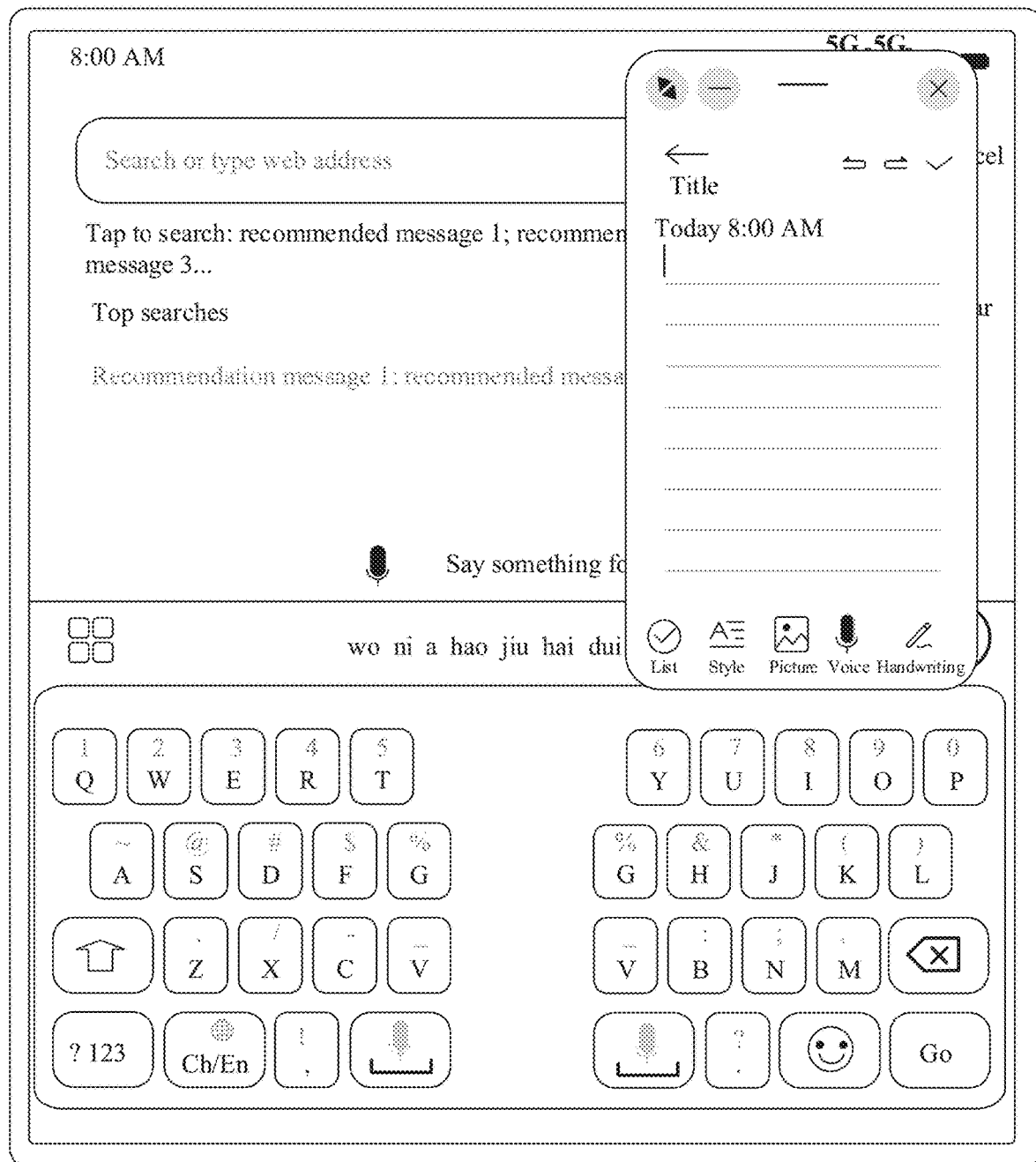
FIG. 6a and FIG. 6b are schematic diagrams of an example interface of displaying a keyboard region when a floating window of another app is displayed in an interface of a single application according to an embodiment of this application.
Figure 6B:

When the interface of the foldable-screen device separately displays an interface of a single app, if a floating window of another application pops up, the user can perform input for the app displayed in the floating window. In some embodiments, that an interface of a memo is displayed in the floating window and an interface of a browser is displayed in a background is used as an example. An operation of triggering the memo to be displayed in the form of a floating window may be: when the foldable-screen device displays the interface of the browser, the user uses a single finger to slide from a left side edge or right side edge of the screen to the middle and pause so as to pull out a sidebar, and then the user taps an icon of the memo in the sidebar to open the memo. After the memo is opened, the interface may be shown in FIG. 5. When the user taps an input box in the interface of the memo, an input cursor appears in the input box in the memo interface, and at the same time, the interface pops up a keyboard region. A position of the keyboard region may be displayed on a lower position of the screen, as shown in FIG. 6*a*. Optionally, the keyboard region may alternatively be displayed in the form of a floating window below the interface of the memo, where a width of the keyboard region is consistent with a width of the floating window of the memo, for example, in the interface shown in FIG. 6*b*. In this display manner, the keyboard region can occupy a smaller area of the screen, and viewing an interface of an app in the background by the user is not affected.

Figure 7:
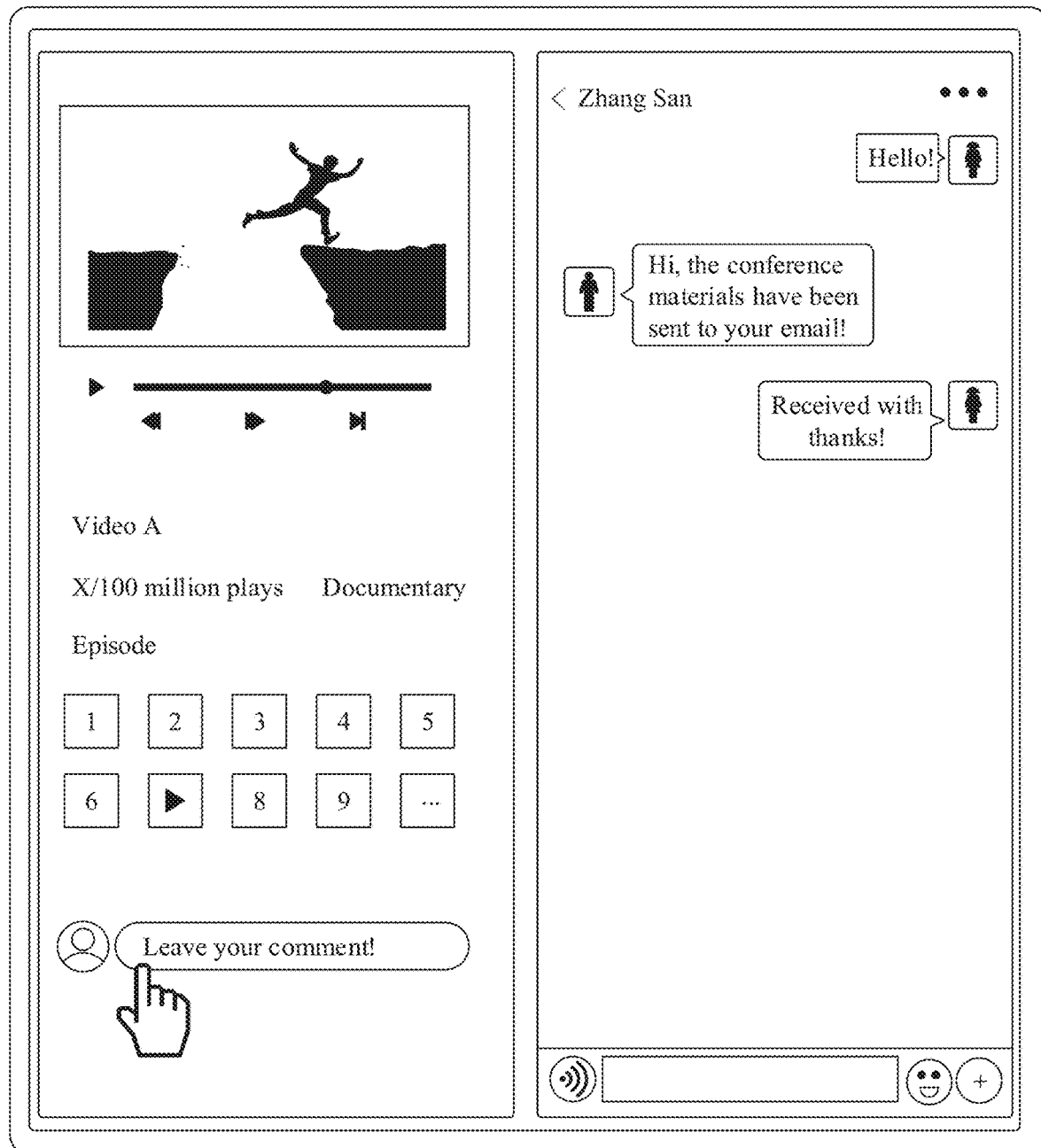
FIG. 7 is a schematic diagram of an example operation of starting a keyboard application in a vertical split-screen interface according to an embodiment of this application.
Figure 8:
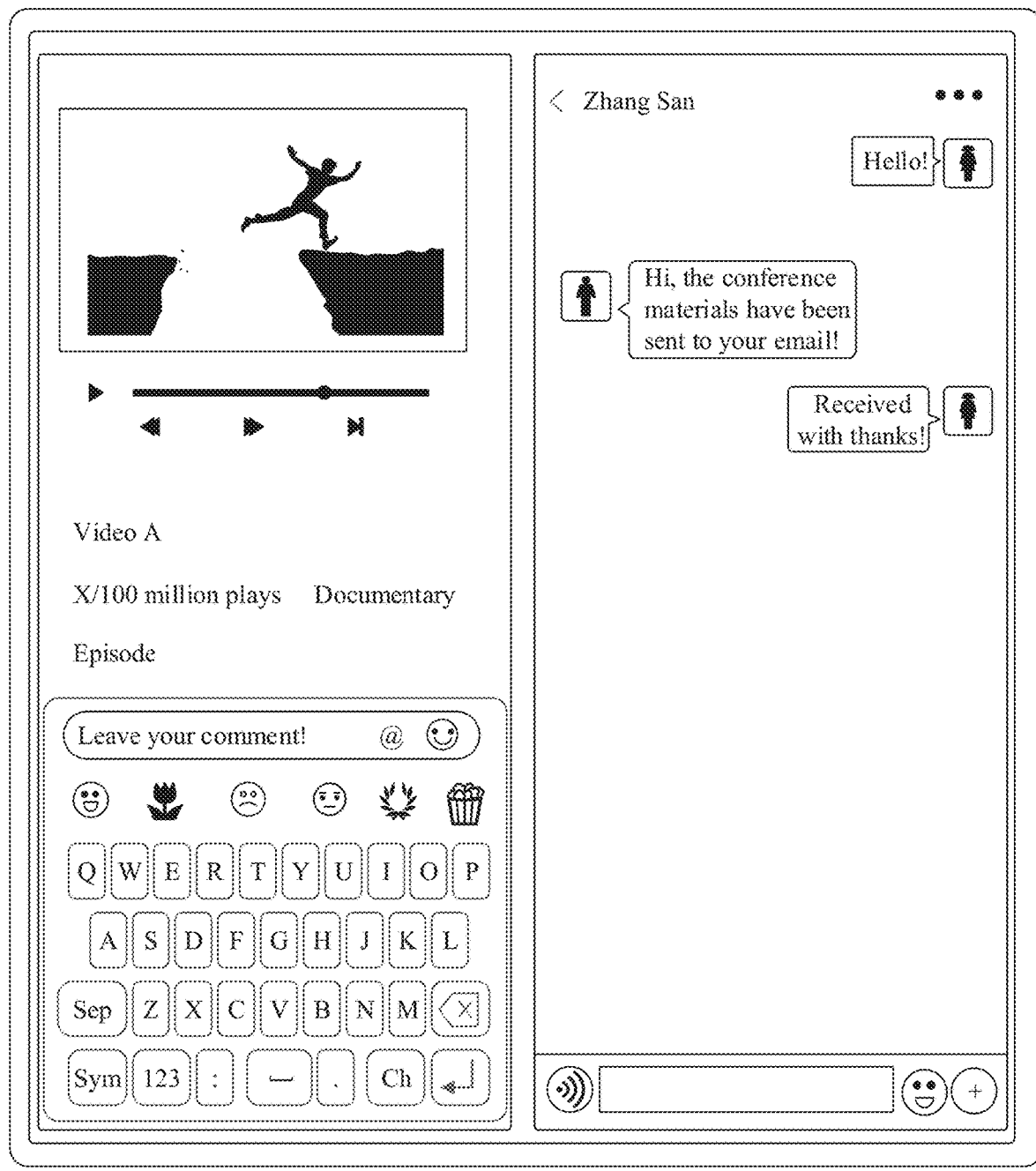
FIG. 8 is a schematic diagram of an interface of displaying a keyboard region after the operation shown in FIG. 7 according to an embodiment of this application.
Figure 9:
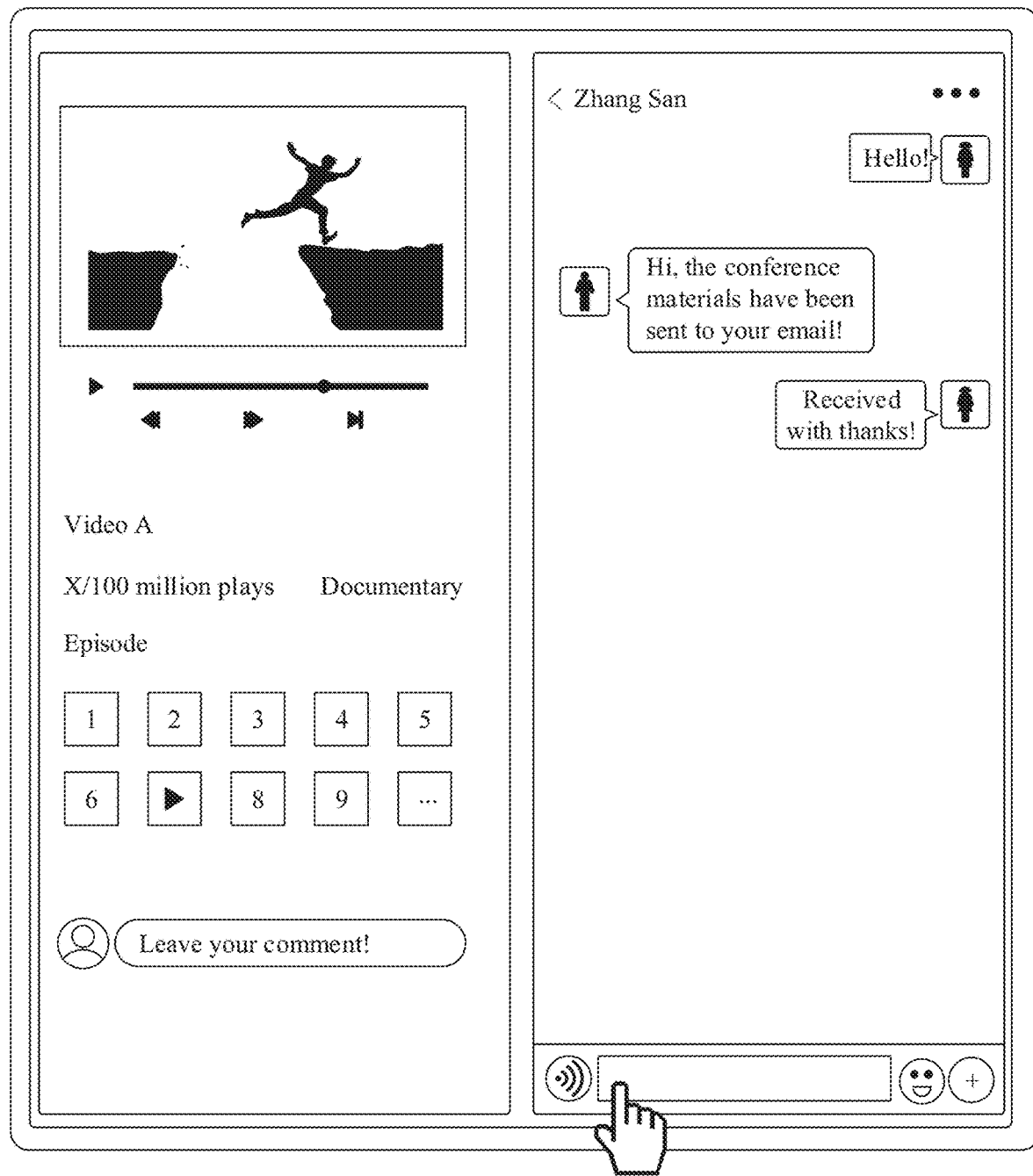
FIG. 9 is a schematic diagram of another example operation of starting a keyboard application in a vertical split-screen interface according to an embodiment of this application.
Figure 10:
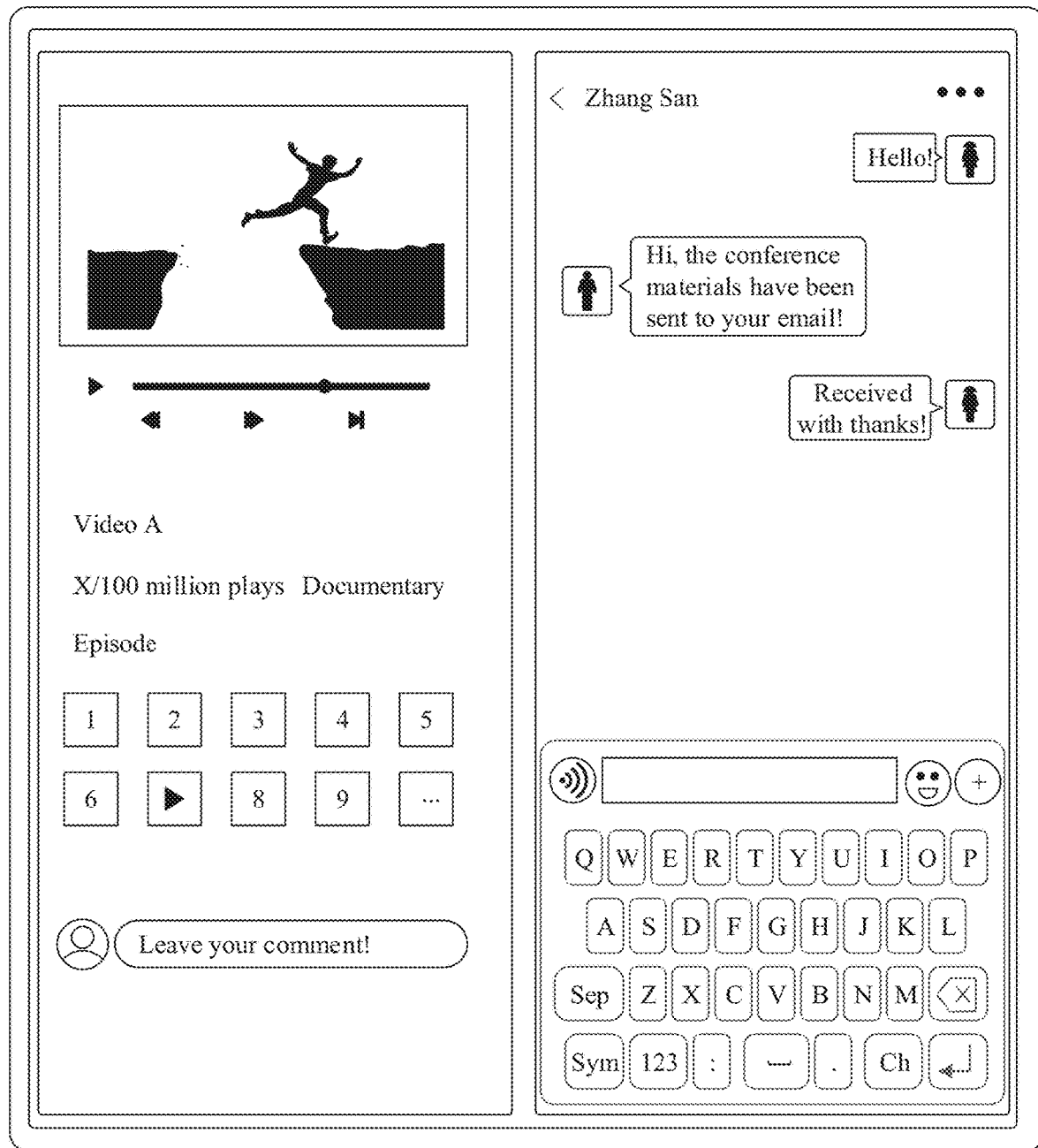
FIG. 10 is a schematic diagram of an example interface of displaying a keyboard region after the operation shown in FIG. 9 according to an embodiment of this application.

When the foldable-screen device displays interfaces of two apps on a split-screen form, reference may be made to the interface shown in FIG. 7. FIG. 7 is a schematic diagram of an interface of vertical split-screen display of two apps according to an embodiment. In FIG. 7, the screen of the foldable-screen device is divided into a first region and a second region. In FIG. 7, that the first region on the left side displays a play interface of a video app and the second region on the right side displays a chat interface of a chat app is used as an example. The first region displays an interface of a first app, and the second region displays an interface of a second app. Certainly, left and right positions of the first region and the second region may alternatively be interchanged. If the user taps a first input box of the first app as shown in FIG. 7, the foldable-screen device starts a keyboard application. In this case, a keyboard region may be displayed on a lower position of the first region on the left side, as shown in FIG. 8, instead of occupying the second region of the second app. If the user taps a second input box of the second app as shown in FIG. 9, the foldable-screen device starts the keyboard application. In this case, the keyboard region may be displayed on a lower position of the second region on the right side, as shown in FIG. 10, instead of occupying the first region of the first app. In this embodiment, compared with a conventional manner of displaying a keyboard region on a lower position of an entire screen, the manner of displaying a keyboard region in a region of a corresponding app occupies a smaller area of the screen. When the user enters text for an app, a position of the keyboard region does not affect a display interface of another app. For example, when the user enters text in an interface of the chat app, a video play interface of the video app is not obstructed by the keyboard region, and the user can watch the video play interface completely, thereby improving user experience.

Figure 11:
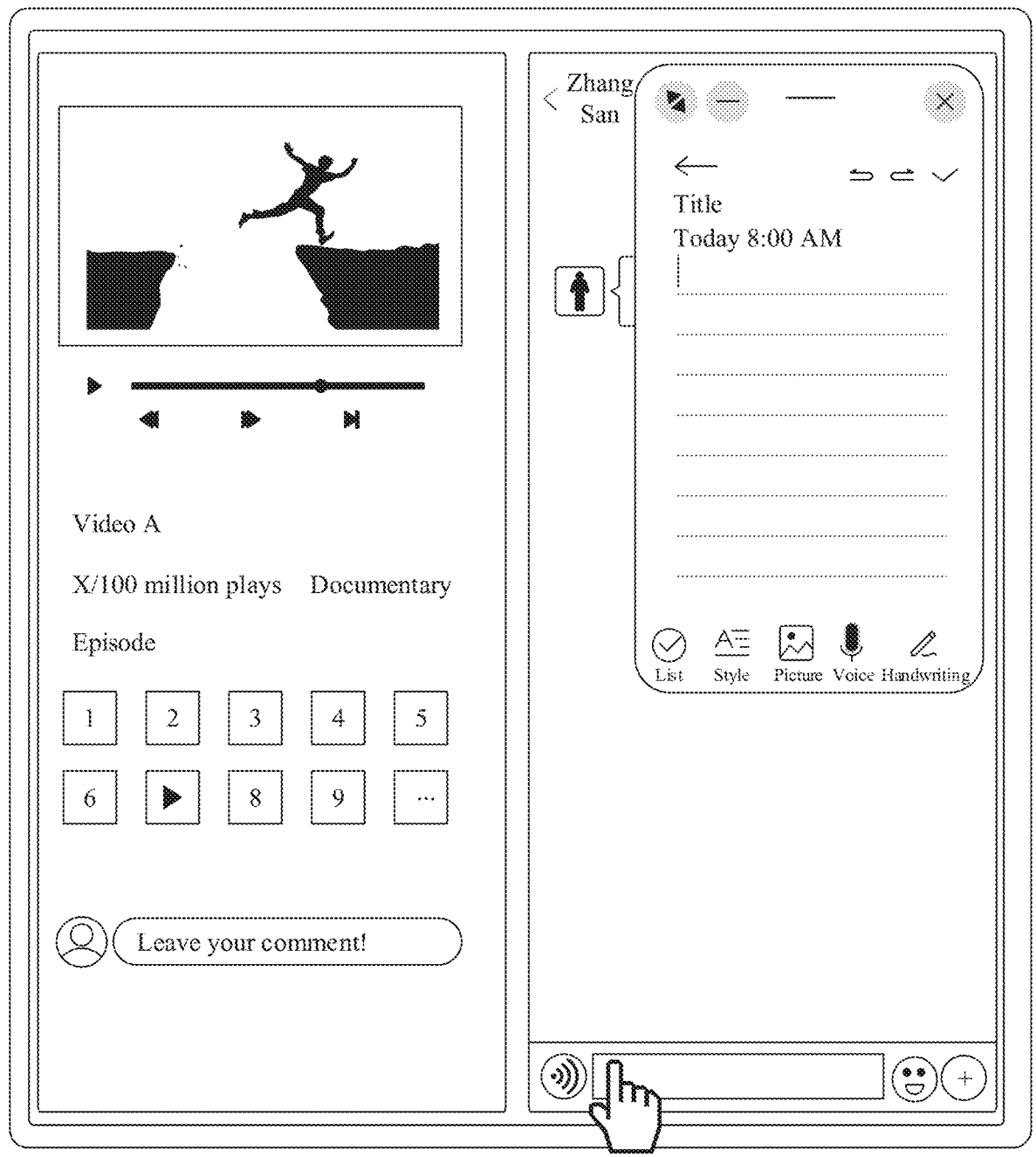
FIG. 11 is a schematic diagram of an example operation of starting a keyboard application when an interface of a third app with a floating window is displayed in a vertical split-screen interface according to an embodiment of this application.
Figure 12:
FIG. 12 is a schematic diagram of an example interface of displaying a keyboard region after the operation shown in FIG. 1l according to an embodiment of this application.
Figure 13:
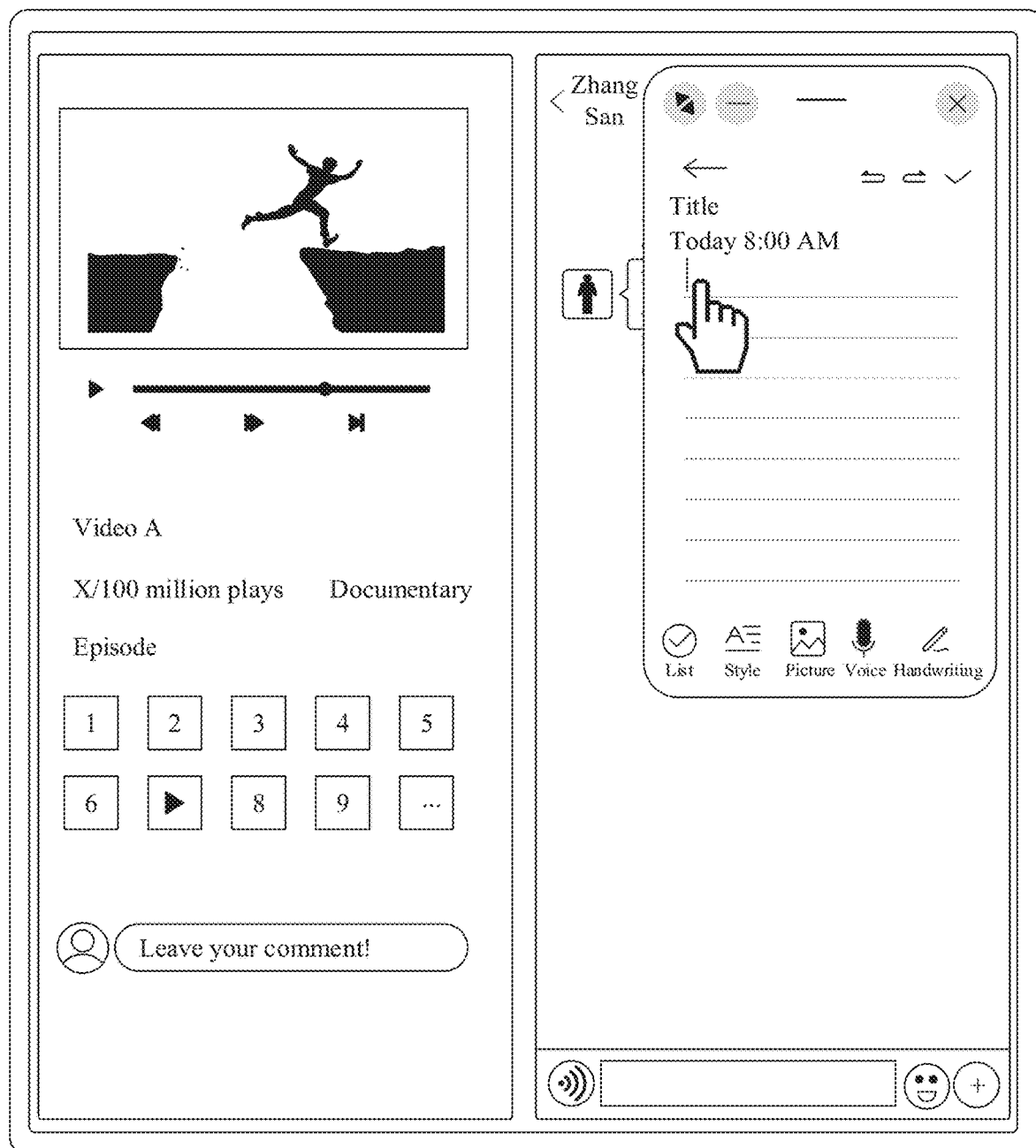
FIG. 13 is a schematic diagram of another example operation of starting a keyboard application when an interface of a third app with a floating window is displayed in a vertical split-screen interface according to an embodiment of this application.

When the foldable-screen device displays interfaces of two apps in a vertical split-screen form, if the user needs to use a third app, the user may perform a third operation of opening the third app. For example, when the foldable-screen device displays interfaces of two apps in a vertical split-screen form, the third app receives a notification message, and the notification message pops up on an upper position of the screen in the form of a banner notification. If the user wants to view the received notification message, the user may tap on a window of the banner notification to open the third app so as to view the notification message. In this case, the foldable-screen device may display an interface of the third app in the form of a floating window. For another example, alternatively, the user may slide leftward from a right side of the screen or slide rightward from a left side of the screen and then pause to pull out a sidebar, and then tap an icon of the third app in the sidebar to open the third app. The interface of the third app may be displayed in the form of a floating window. Herein, a region in which the interface of the third app is distributed is used as the third region. In FIG. 11, that the third region is displayed in the second region is used as an example. If the interface of the third app with a floating window is displayed, when the user taps on the first input box, the keyboard region can be displayed on a lower position the first region, or when the user taps on the second input box, the keyboard region can be displayed on a lower position of the second region, as shown in FIG. 12. When the user taps on a third input box of the third application in the third region as shown in FIG. 13, it indicates that an intention of the user is to enter text in the third input box. In this case, the foldable-screen device starts the keyboard application and displays the key board region in the form of a floating window.

Figure 14:
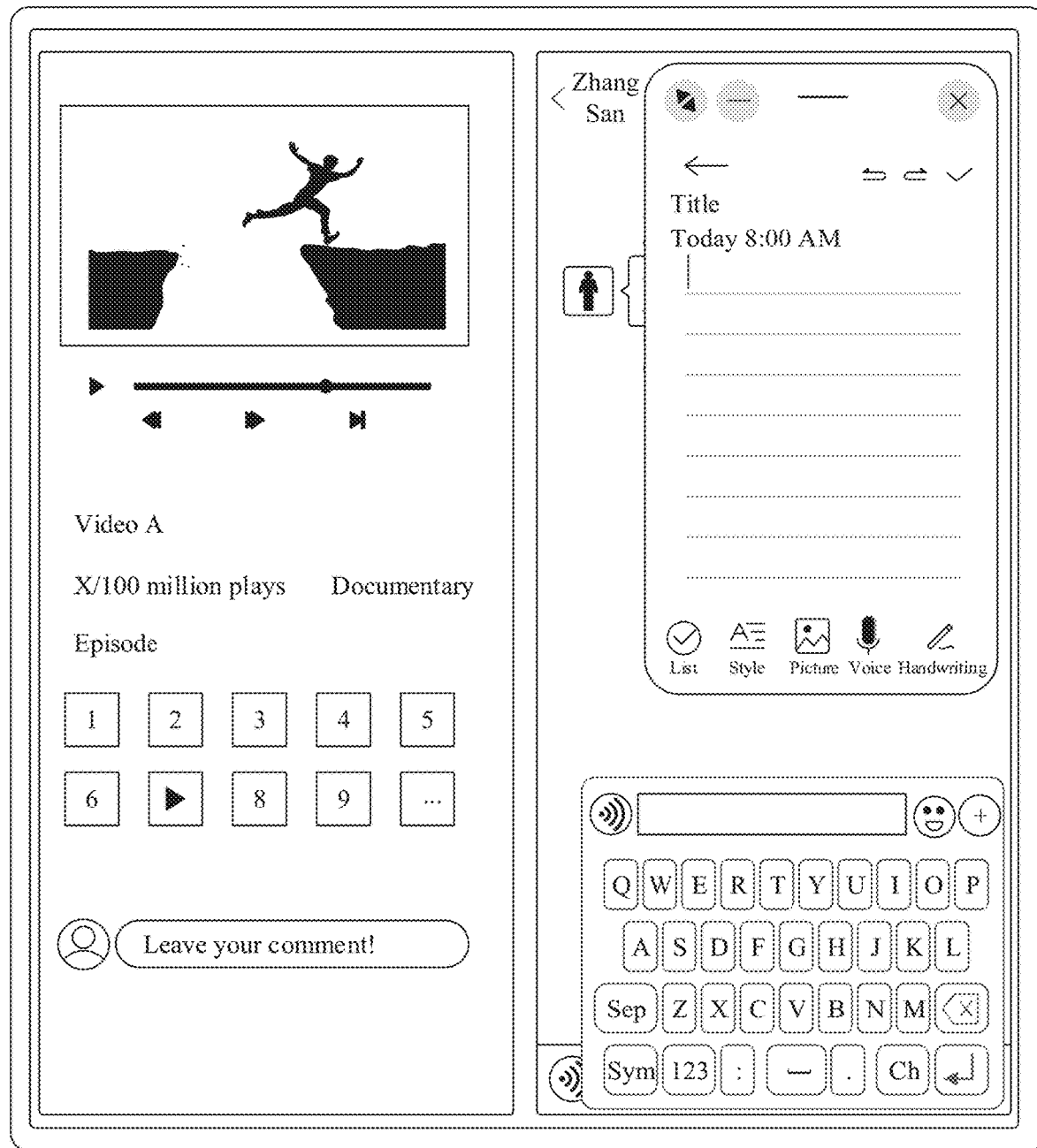
FIG. 14 is a schematic diagram of an example interface of displaying a key board region in the form of a floating window after the operation shown in FIG. 13 according to an embodiment of this application.

In some embodiments, the third region may be displayed on an upper position of the second region, and the keyboard region may be displayed the form of a floating window on an upper position of the first region. In some embodiments, the third region may alternatively be displayed on an upper position of the second region as shown in FIG. 14, and in this case, the keyboard region may be displayed in the form of a floating window on a lower position of the second region, where an interface of an app displayed in a floating manner is vertically adjacent to the keyboard region. Most users are accustomed to an operation region located on a lower position of a display region, which is convenient for the user to input when holding a terminal device. The manner of displaying the keyboard region shown in FIG. 14 can help the user recognize that the keyboard region displayed in a floating manner is input for the app displayed in a floating manner, and further it is convenient for the user to operate the keyboard region. Therefore, this manner is more appropriate.

When the foldable-screen device displays interfaces of two apps in a vertical split-screen form, and the third app is displayed in the form of a floating window on the upper position of the second region, the keyboard region displayed in the form of a floating window in FIG. 14 occupies a smaller area than the keyboard region in FIG. 12, which can reduce an area of the keyboard region covering the screen. In this embodiment, displaying the keyboard region in the form of a floating window occupies a smaller area of the screen when compared a conventional manner of displaying the keyboard region on a lower position of the entire screen. In addition, if the interface of the third app with a floating window is displayed, for input for different apps, differentiated display of the keyboard region can improve the user's recognition of a position of the input cursor, which is convenient for the user to identify which app the input is currently performed for, thereby improving user experience.

Figure 15:
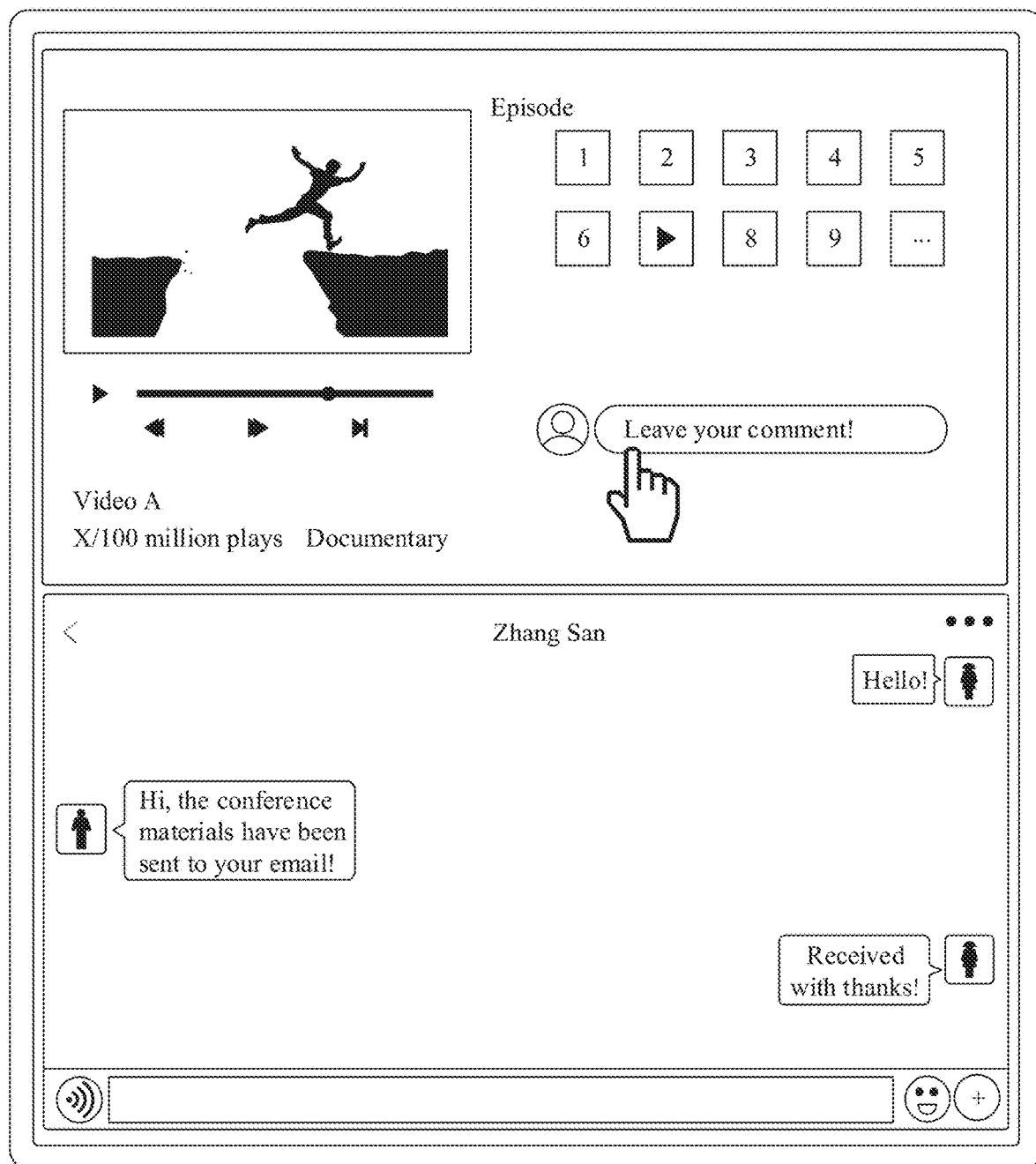
FIG. 15 is a schematic diagram of an example operation of starting a keyboard application in a horizontal split-screen interface according to an embodiment of this application.
Figure 16:
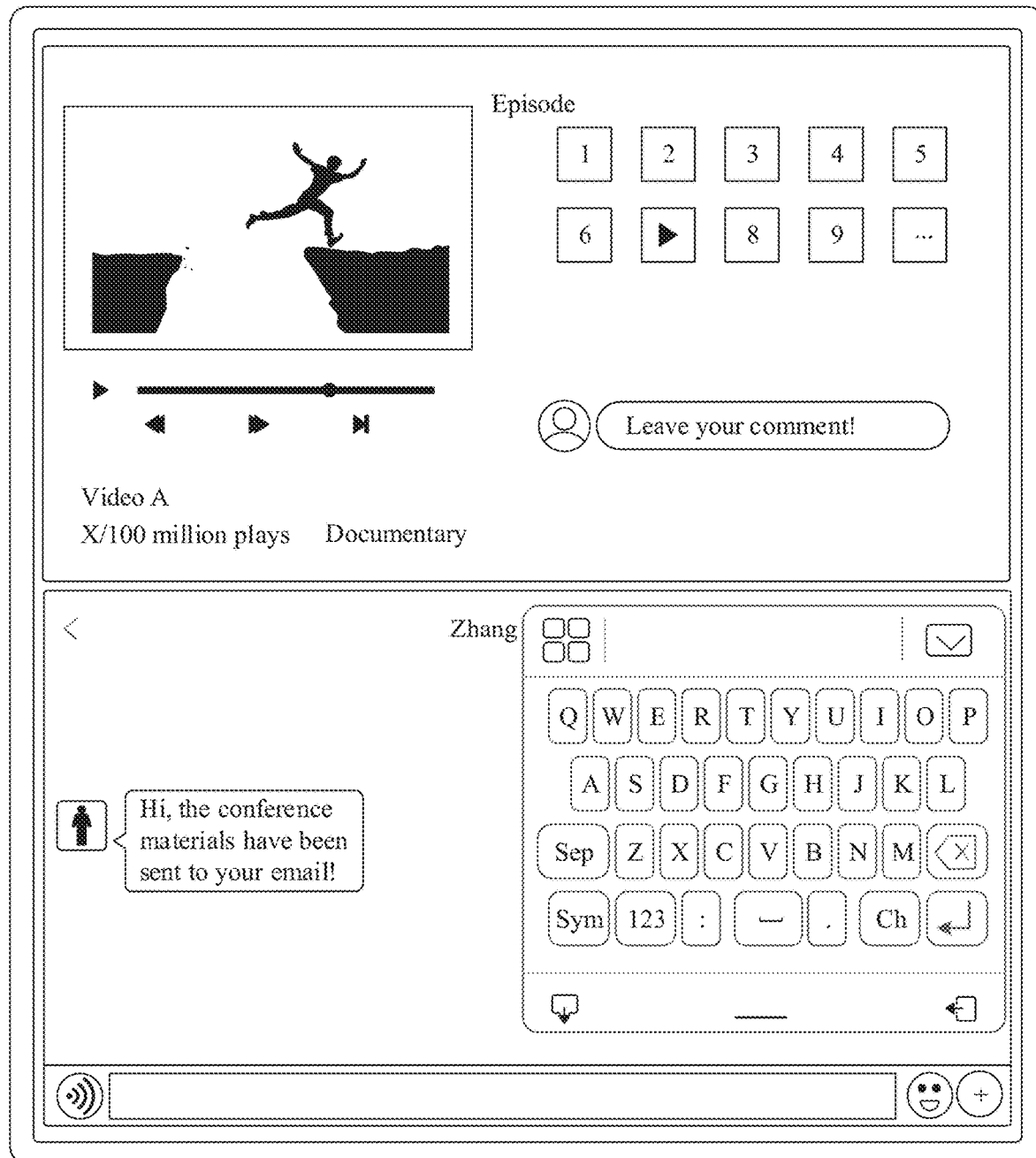
FIG. 16 is a schematic diagram of an example interface of displaying a keyboard region after the operation shown in FIG. 15 according to an embodiment of this application.
Figure 17:
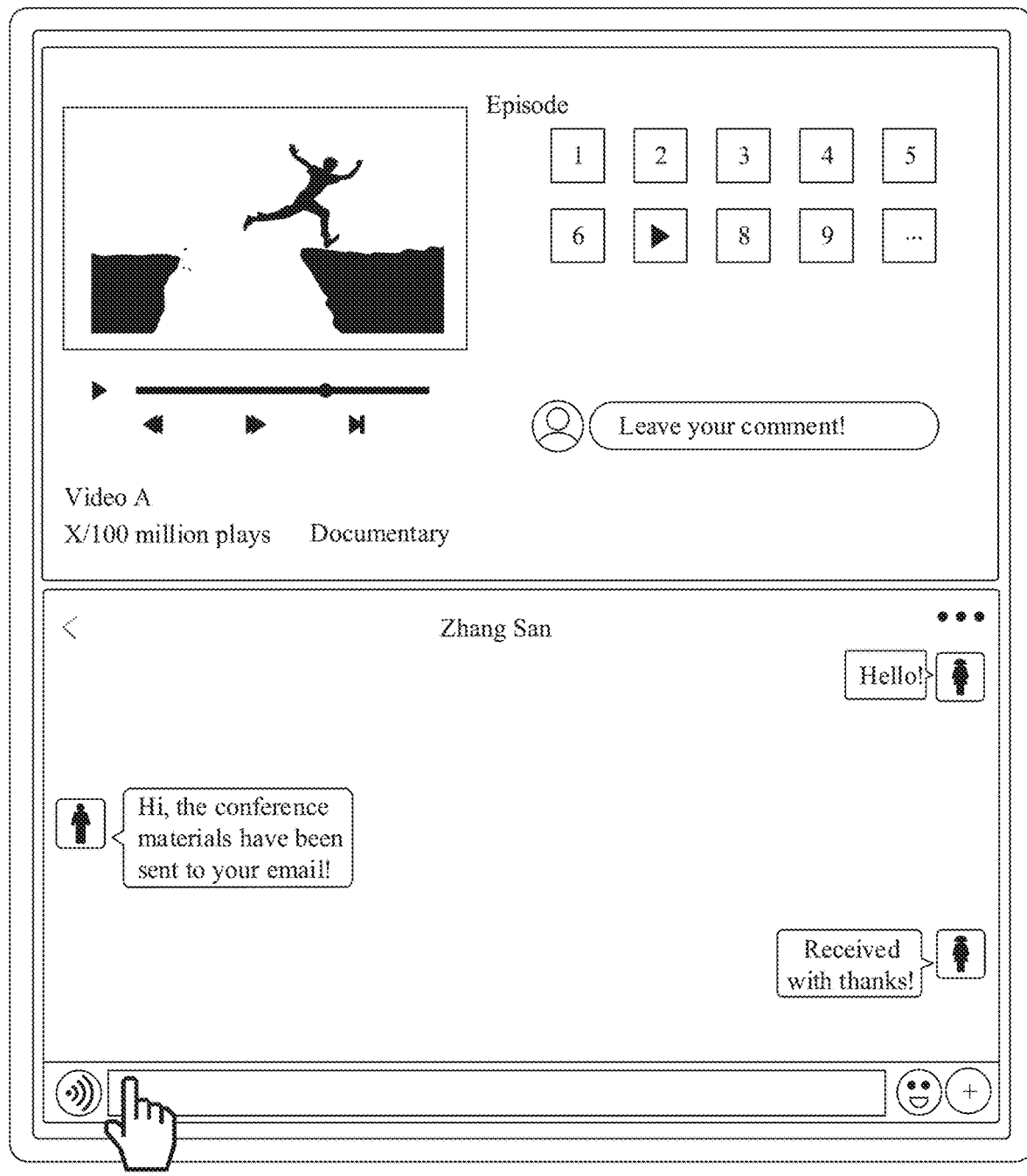
FIG. 17 is a schematic diagram of another example operation of starting a keyboard application in a horizontal split-screen interface according to an embodiment of this application.

When the foldable-screen device displays interfaces of two apps on a horizontal split-screen form, reference may be made to the interface shown in FIG. 15. In FIG. 15, the screen of the foldable-screen device is divided into a first region and a second region. The first region is distributed in an upper half of the screen, and the second region is distributed in a lower half of the screen. The first region displays an interface of a first app, and the second region displays an interface of a second app. In FIG. 15, that the first region in the upper half of the screen displays a play interface of a video app and the second region on the lower half of the screen displays a chat interface of a chat app is used as an example. If the user taps a first input box of the first app as shown in FIG. 15, the foldable-screen device starts the keyboard application. In this case, the keyboard region may be displayed in the second region in the lower half of the screen, as shown in FIG. 16. If the user taps a second input box of the second app as shown in FIG. 17, the foldable-screen device starts the keyboard application. In this case, the keyboard region may still be displayed in the second region in the lower half of the screen, as shown in FIG. 16. Usually when a person holds a foldable-screen device, the person is accustomed to holding it at a lower end of the foldable-screen device. Therefore, regardless of which app the input is performed for, the keyboard region is displayed in the second region on the lower position of the screen, so that it is convenient for an input operation if the user holds the foldable-screen device, thereby improving user experience. In some embodiments, displaying the keyboard region on the right side of the second region can avoid a part of the interface of the second app for display, which can avoid excessively obstructing the screen, thereby improving user experience.

When the foldable-screen device displays interfaces of two apps in a horizontal split-screen form, if the user needs to use the third app, the user may perform an operation of opening the third app. The interface of the third app may be displayed in the form of a floating window. Herein, a region in which the interface of the third app is distributed is used as the third region. If the interface of the third app with a floating window is displayed, when the user taps on the first input box, the keyboard region can be displayed on the second region, or when the user taps on the second input box, the keyboard region can be displayed on the second region. When the user taps on the third input box of the third application in the third region, it indicates that an intention of the user is to enter text in the third input box. In this case, the foldable-screen device starts the keyboard application and displays the keyboard region in the form of a floating window. For a same display object, a form of displaying a floating window occupies a smaller area than a form of displaying a non-floating window. In this embodiment, displaying the keyboard region in the form of a floating window occupies a smaller area of the screen when compared a conventional manner of displaying the keyboard region on a lower position of the entire screen. In addition, if the interface of the third app with a floating window is displayed, for input for different apps, differentiated display of the keyboard region can improve the user's recognition of a position of the input cursor, which is convenient for the user to identify which app the input is currently performed for, thereby improving user experience.

Figure 18:
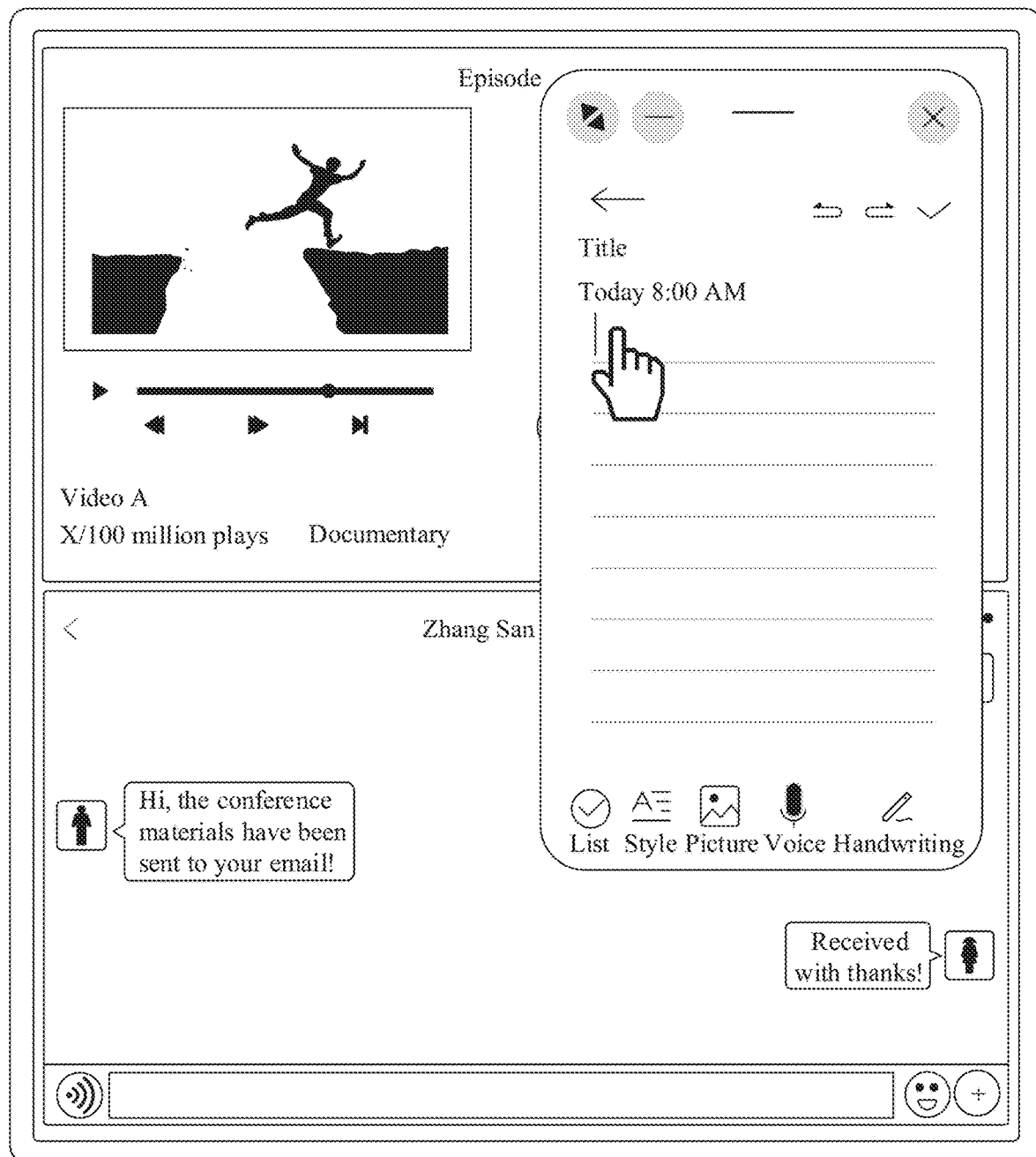
FIG. 18 is a schematic diagram of an example operation of starting a keyboard application when an interface of a third app with a floating window is displayed in a horizontal split-screen interface according to an embodiment of this application.
Figure 19:
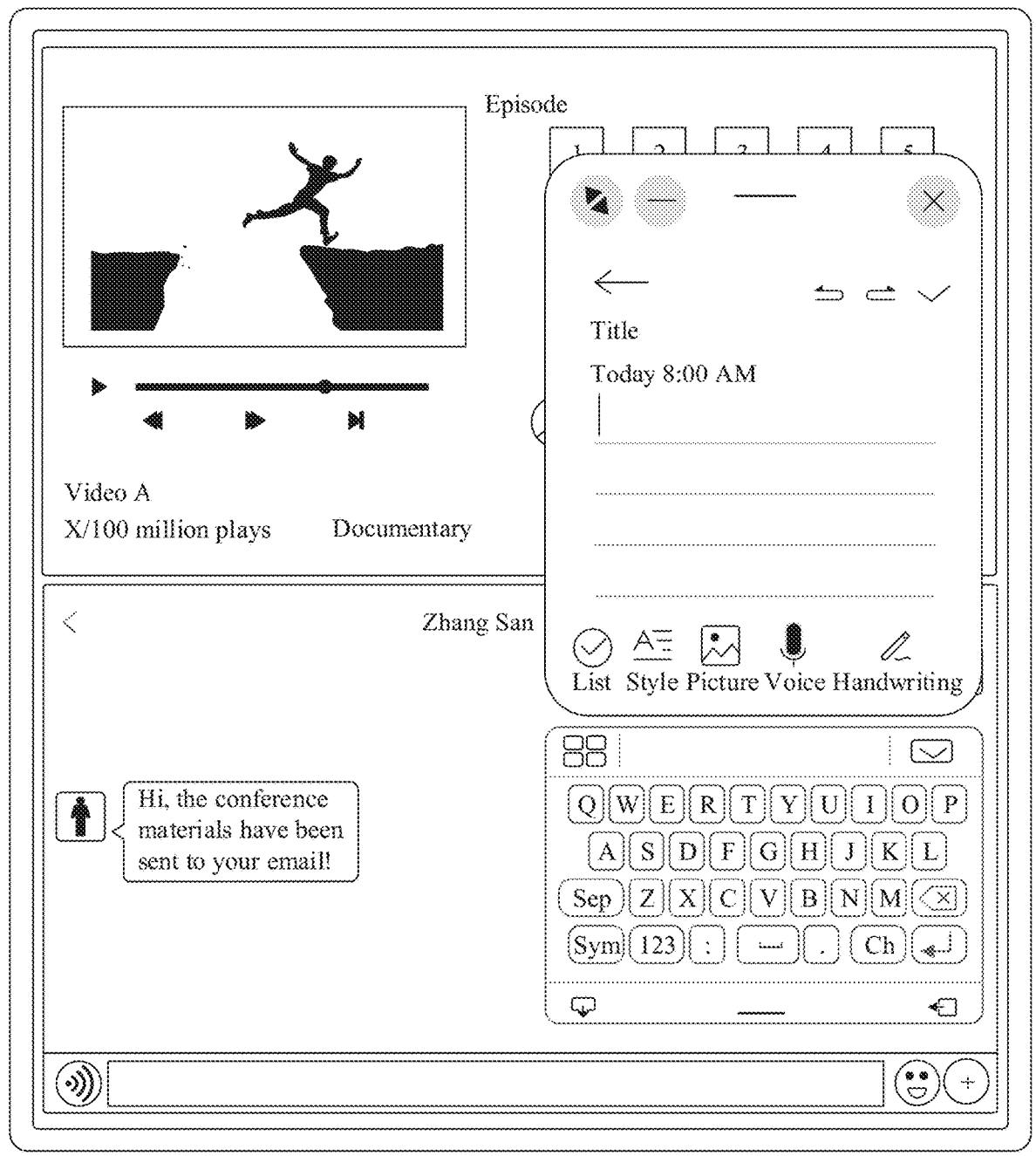
FIG. 19 is a schematic diagram of an example interface of displaying a keyboard region after the operation shown in FIG. 18 according to an embodiment of this application.
Figure 21:
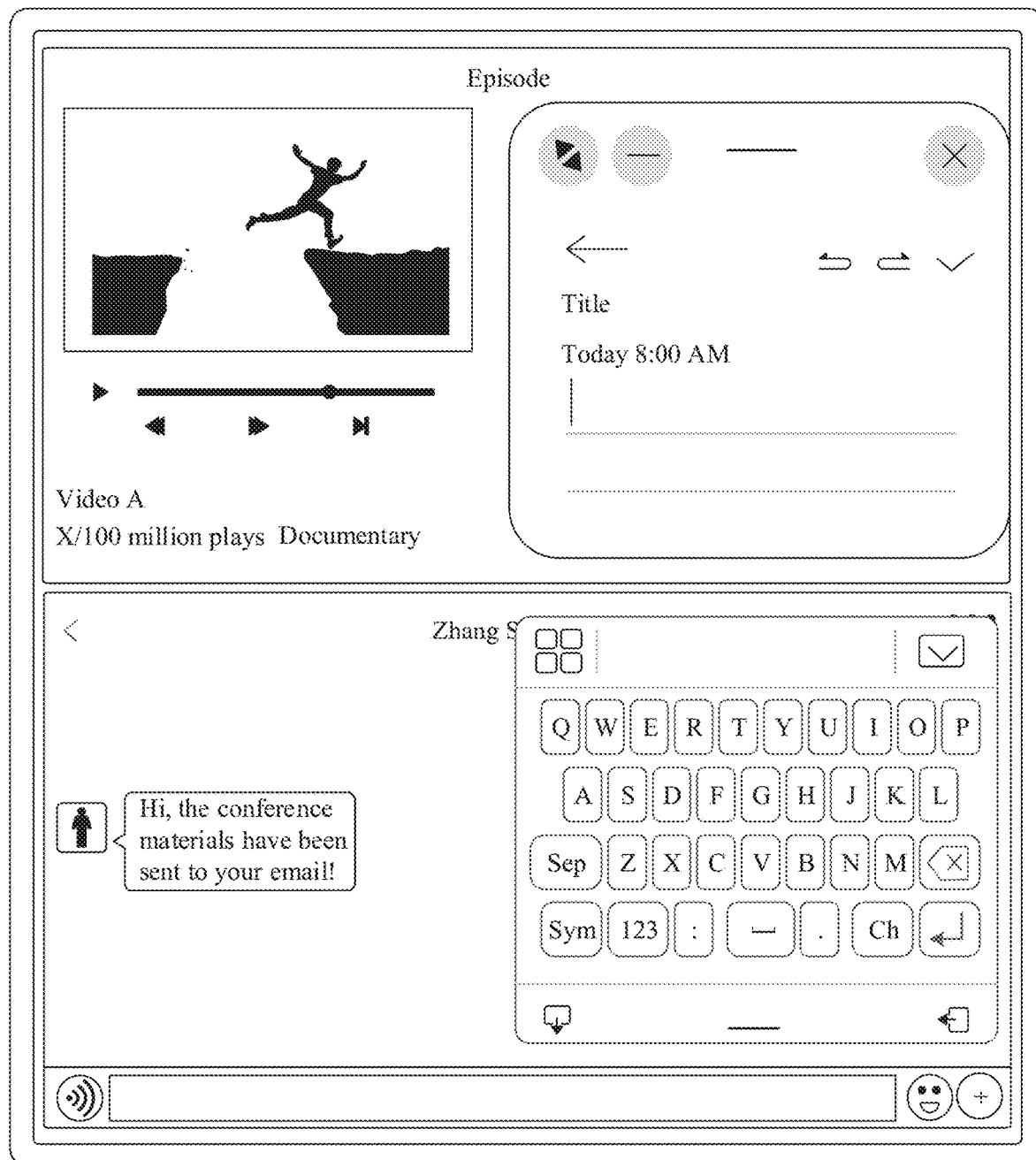
FIG. 21 is a schematic diagram of an interface when an interface of a third app with a floating window is displayed in a horizontal split-screen interface and a keyboard application is started according to an embodiment of this application.

When the foldable-screen device displays interfaces of two apps on a horizontal split-screen form, after the user opens the third app, reference may be made to the interface shown in FIG. 18. In FIG. 18, that the third app is a memo is used as an example. In some embodiments, the third region may be located in the first region, or may be located in the second region, or may be partially located in the first region and partially located in the second region. In FIG. 18, that the third region is partially located in the first region and partially located in the second region is used as an example. If the user needs to enter a character for the third app in the third region, the user taps on the third input box of the third app to start the keyboard application, and the input cursor appears in an interface of the memo displayed in the form of a floating window, as shown in FIG. 18. In this case, the keyboard region may be displayed on the right side of the second region as shown in FIG. 19, where the keyboard region is vertically adjacent to the interface of the third app in the third region. In some embodiments, the third region may be reduced in height as shown in FIG. 19 to avoid the keyboard region. In some embodiments, the keyboard region may alternatively be shown in FIG. 21, the third region is located on a right side of the first region, and the keyboard region is located on the right side of the second region, so that the keyboard region can be completely displayed in the interface and obstruction of the screen can be reduced while facilitating input of the user, thereby improving user experience.

Figure 20:
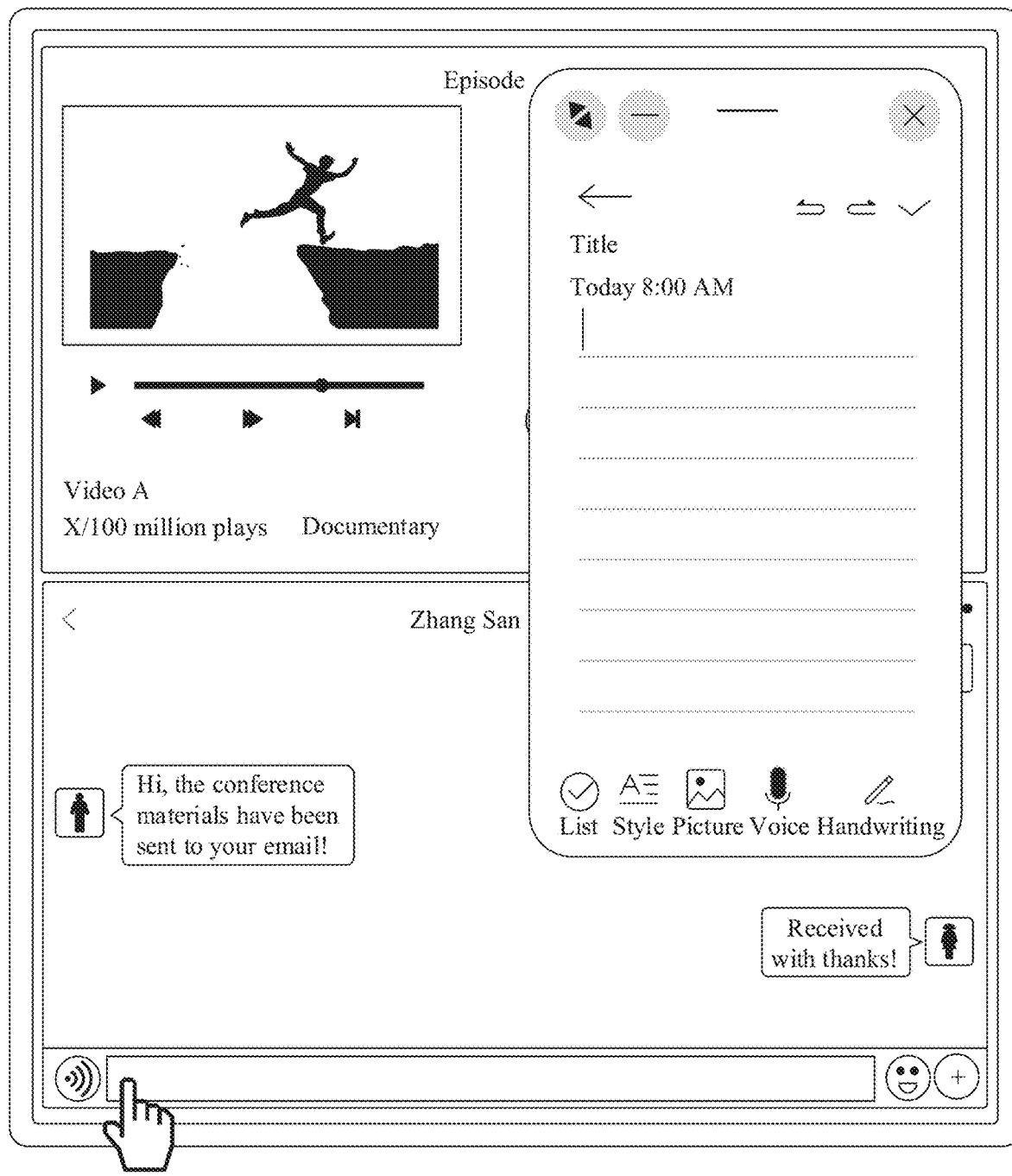
FIG. 20 is a schematic diagram of another example operation of starting a keyboard application when an interface of a third app with a floating window is displayed in a horizontal split-screen interface according to an embodiment of this application.

In some embodiments, when two apps are displayed in a horizontal split-screen form and an interface of an app with a floating window is displayed, if the user needs to enter text for the second input box, the user can tap on the second input box as shown in FIG. 20 to start the keyboard application. In this case, the keyboard region may be displayed on the right side of the second region, and the third region may be reduced in height to avoid the keyboard region. For example, in an interface shown in FIG. 21, obstruction of the screen is reduced while facilitating input of the user, thereby improving user experience.

Figure 22:
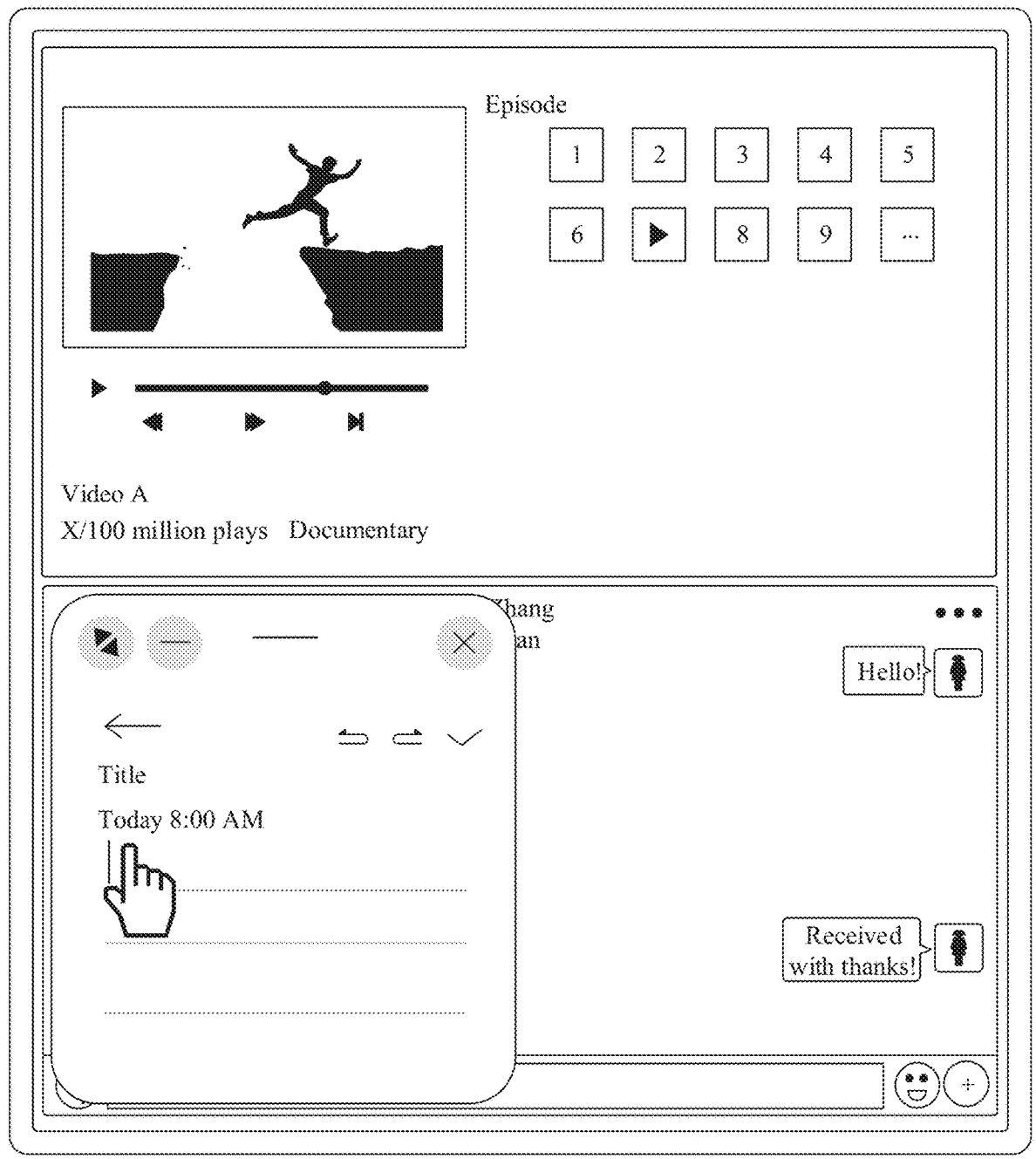
FIG. 22 is a schematic diagram of an example operation of starting a keyboard application when an interface of a third app with a floating window is displayed in a horizontal split-screen interface according to an embodiment of this application.
Figure 23:
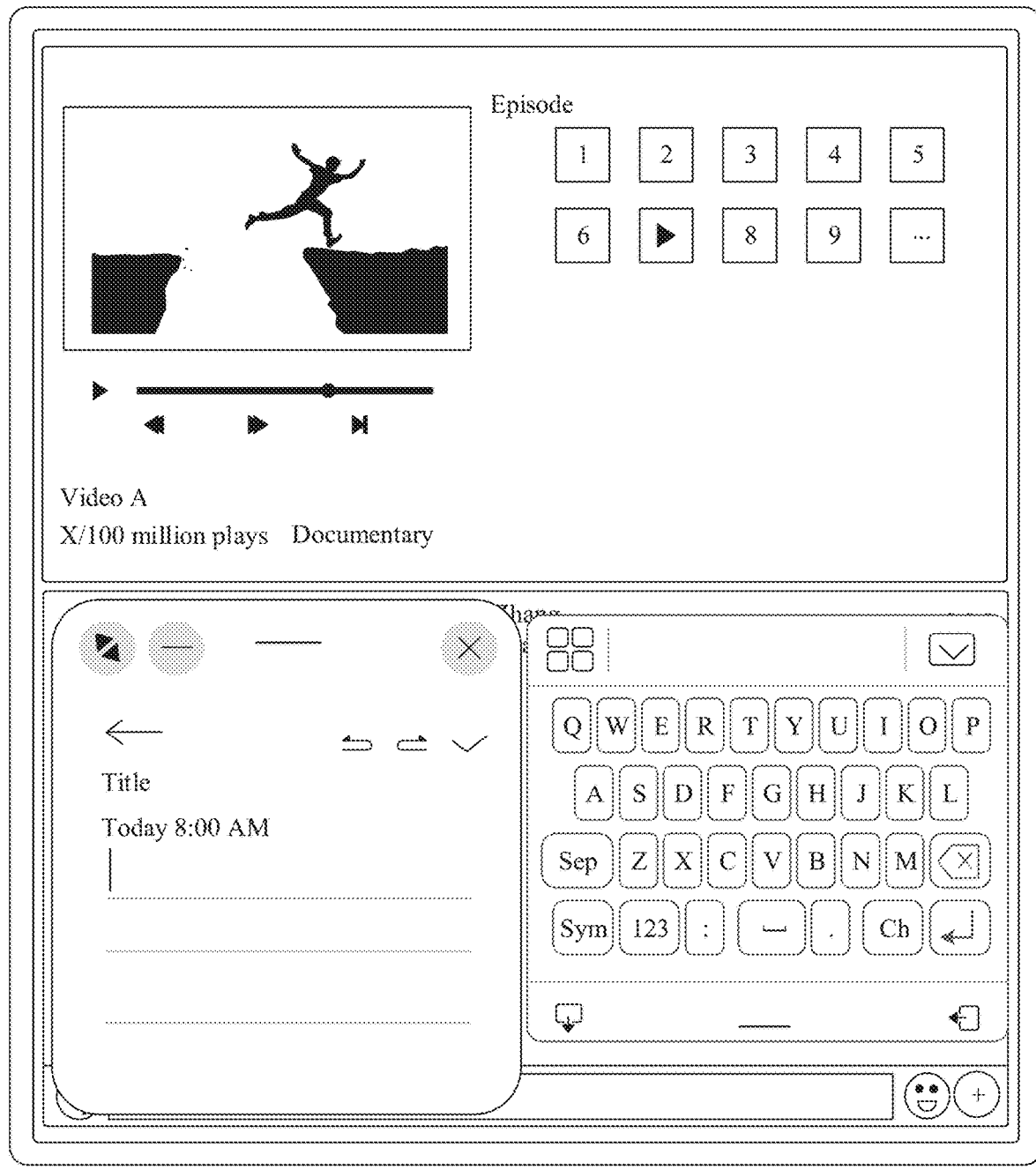
FIG. 23 is a schematic diagram of an example interface of displaying a keyboard region after the operation shown in FIG. 22 according to an embodiment of this application.

In some embodiments, when two apps are displayed in a horizontal split-screen form and an interface of an app with a floating window is displayed, the user may also drag the floating window to move the third region of the third app. For example, when the first app plays a video, in order not to affect viewing of the video, the user drags the floating window of the memo to the left side of the second region. For example, in the interface shown in FIG. 22, the interface of the memo is displayed on the left side of the second region, and if the user needs to enter a character for the memo app, the user taps on the third input box. After the keyboard application is started, the foldable-screen device may display the keyboard region on the right side of the second region, as shown in FIG. 23. In this case, the keyboard region is horizontally adjacent to the third region, viewing the video by the user is not affected, and the memo can be further operated, which is convenient for use by the user.

Figure 24:
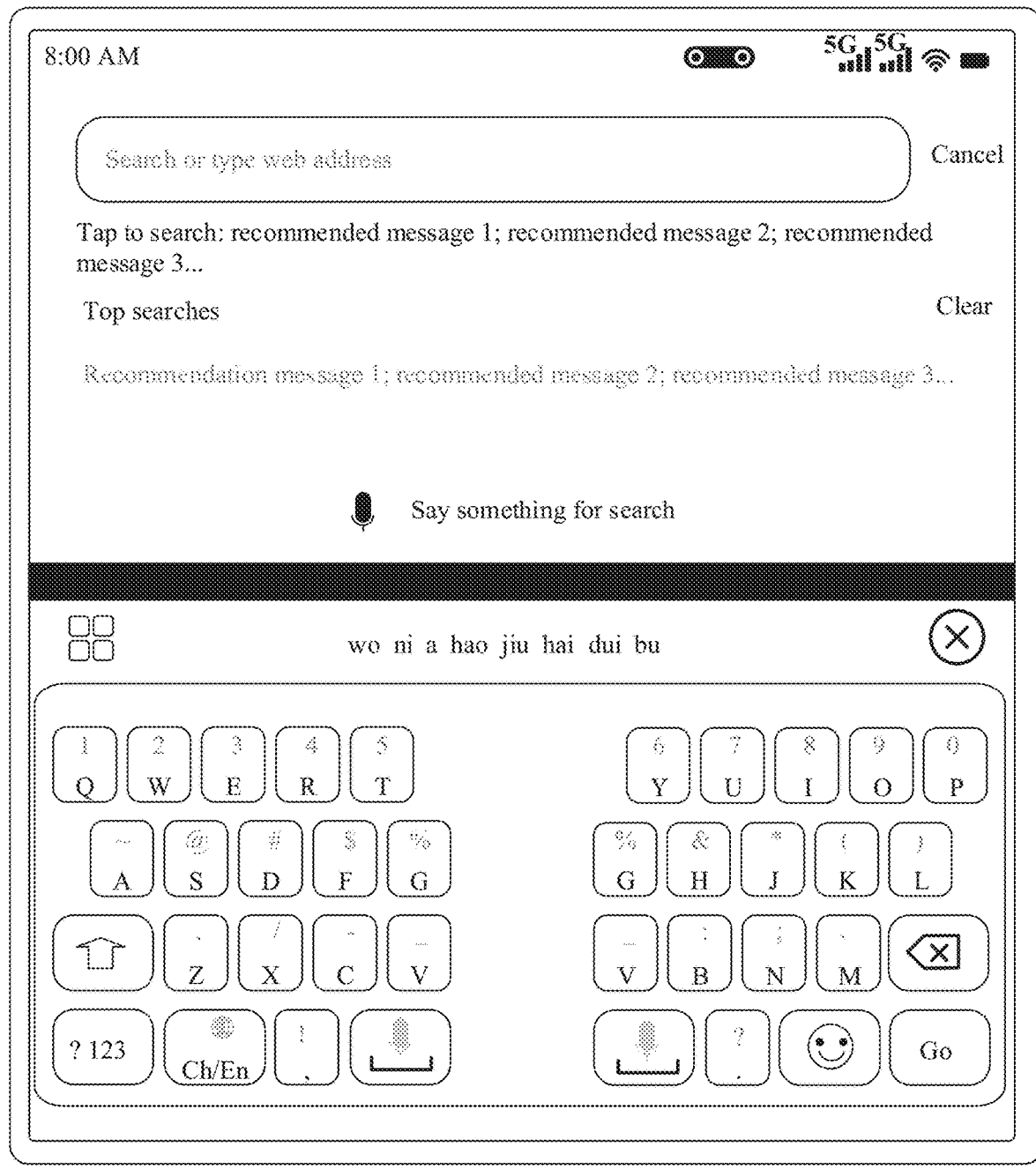
FIG. 24 is a schematic diagram of an example interface when an interface of a single application is displayed during running in a notebook computer mode according to an embodiment of this application.
Figure 25:
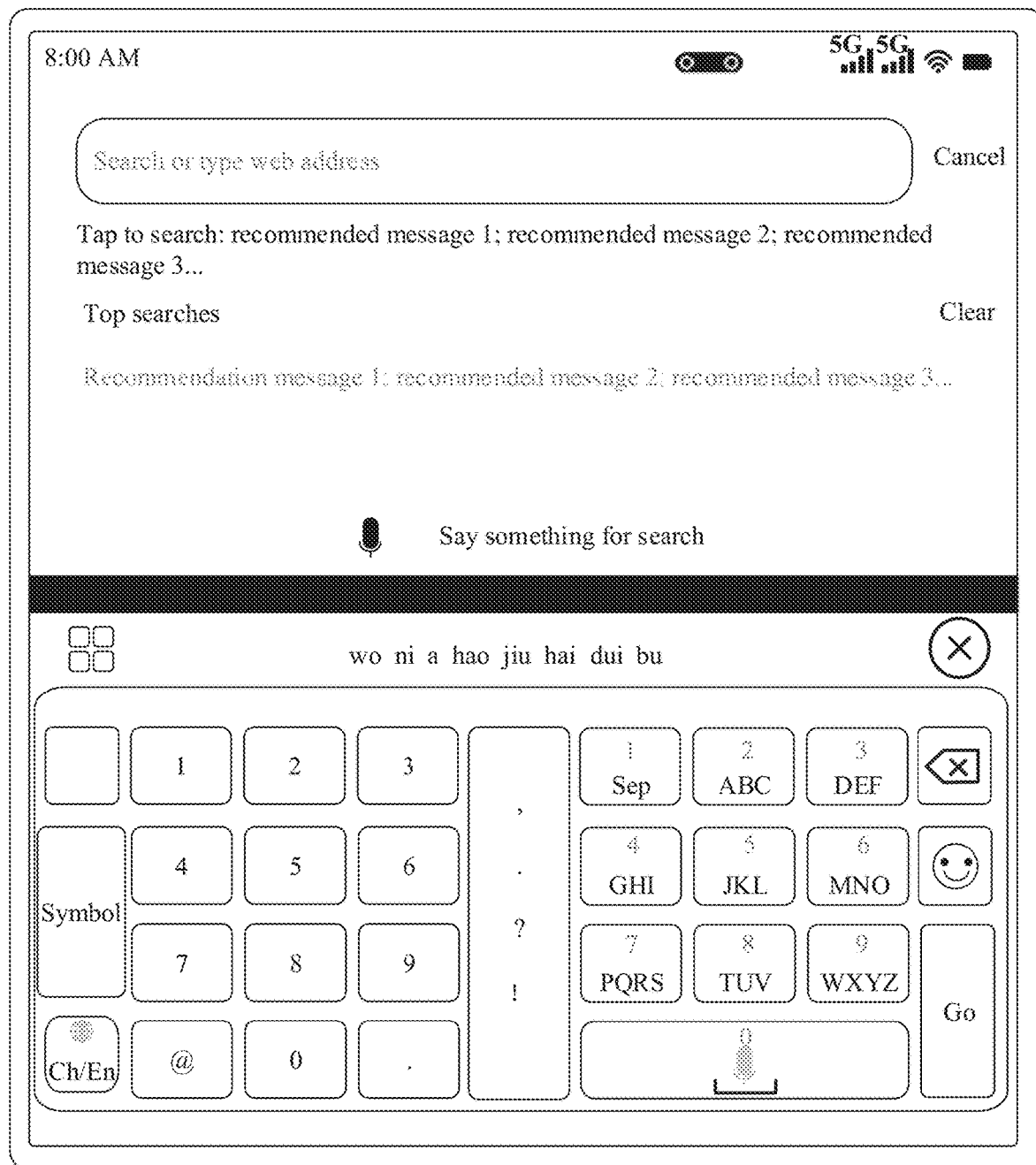
FIG. 25 is a schematic diagram of another example interface when an interface of a single application is displayed during running in a notebook computer mode according to an embodiment of this application.

In some embodiments, the foldable-screen device may also be used in the form of a notebook computer and run in a notebook computer mode. In this case, the foldable-screen device is in a horizontal split-screen mode. In some embodiments, a folding portion of a foldable screen may be used to distinguish between a display screen part (an upper half of the screen) and a keyboard part (a lower half of the screen). That is, the first region (namely, a region of the upper half of the screen) is used as a display screen, and the second region (a region of the lower half of the screen) is used as a keyboard. During use, the screen may be folded about 90 degrees and placed in the form of a notebook computer for use. If the foldable-screen device displays an interface of a single application, when the user needs to input, the foldable-screen device displays the interface of the app in the first region, and displays the keyboard region in the second region. FIG. 24 is a schematic diagram of an interface in which a keyboard region is displayed in the form of a QWERTY keyboard when a foldable-screen device runs a single application in the mode of a notebook computer. FIG. 25 is a schematic diagram of an interface in which a keyboard region is displayed in a 9-key Pinyin form when a foldable-screen device runs a single application in the mode of a notebook computer. The black region in FIG. 24 and FIG. 25 is a folding portion.

Figure 26:
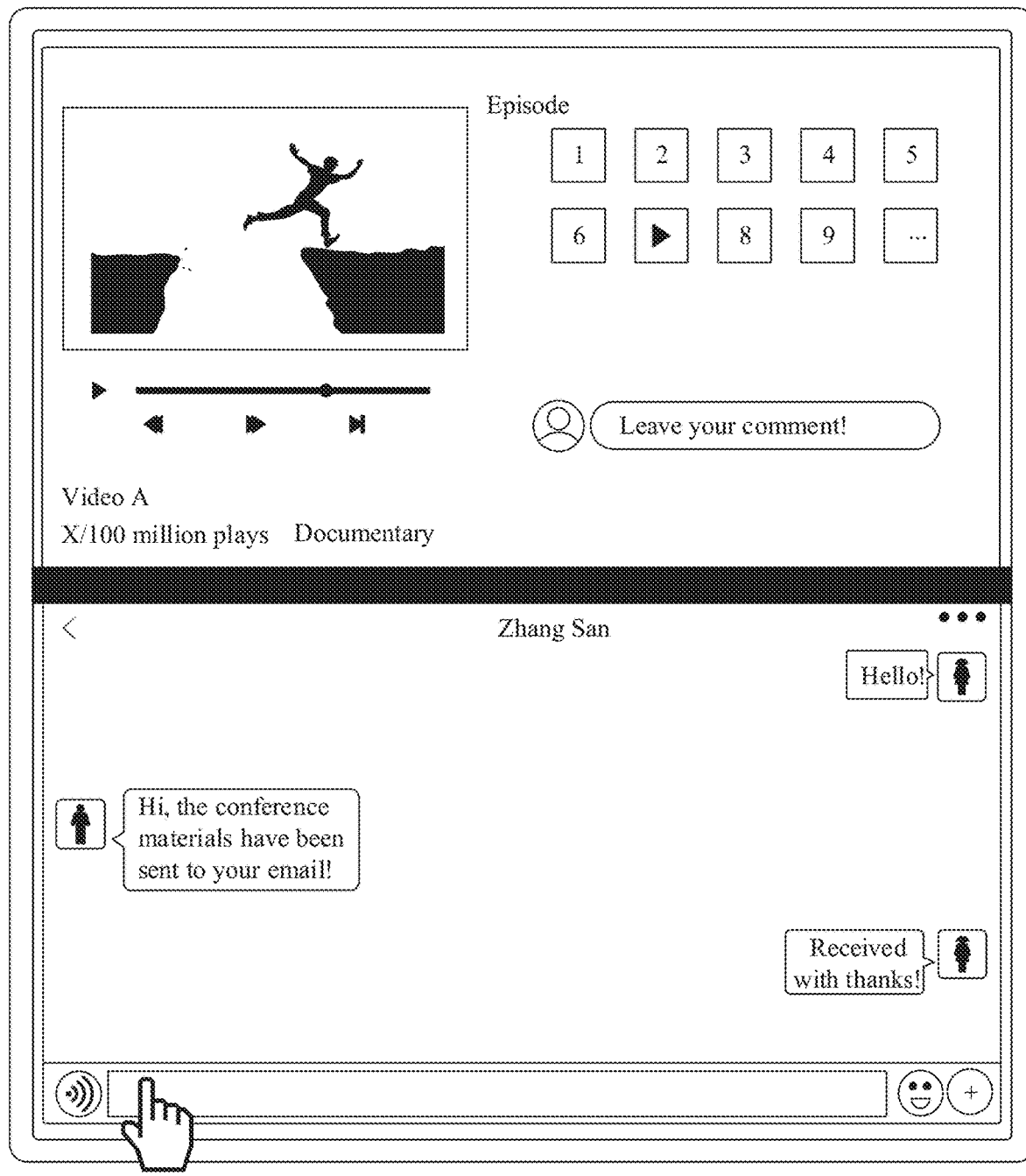
FIG. 26 is a schematic diagram of an example operation of starting a keyboard application when a horizontal split-screen interface is displayed during running in a notebook computer mode according to an embodiment of this application.
Figure 27:
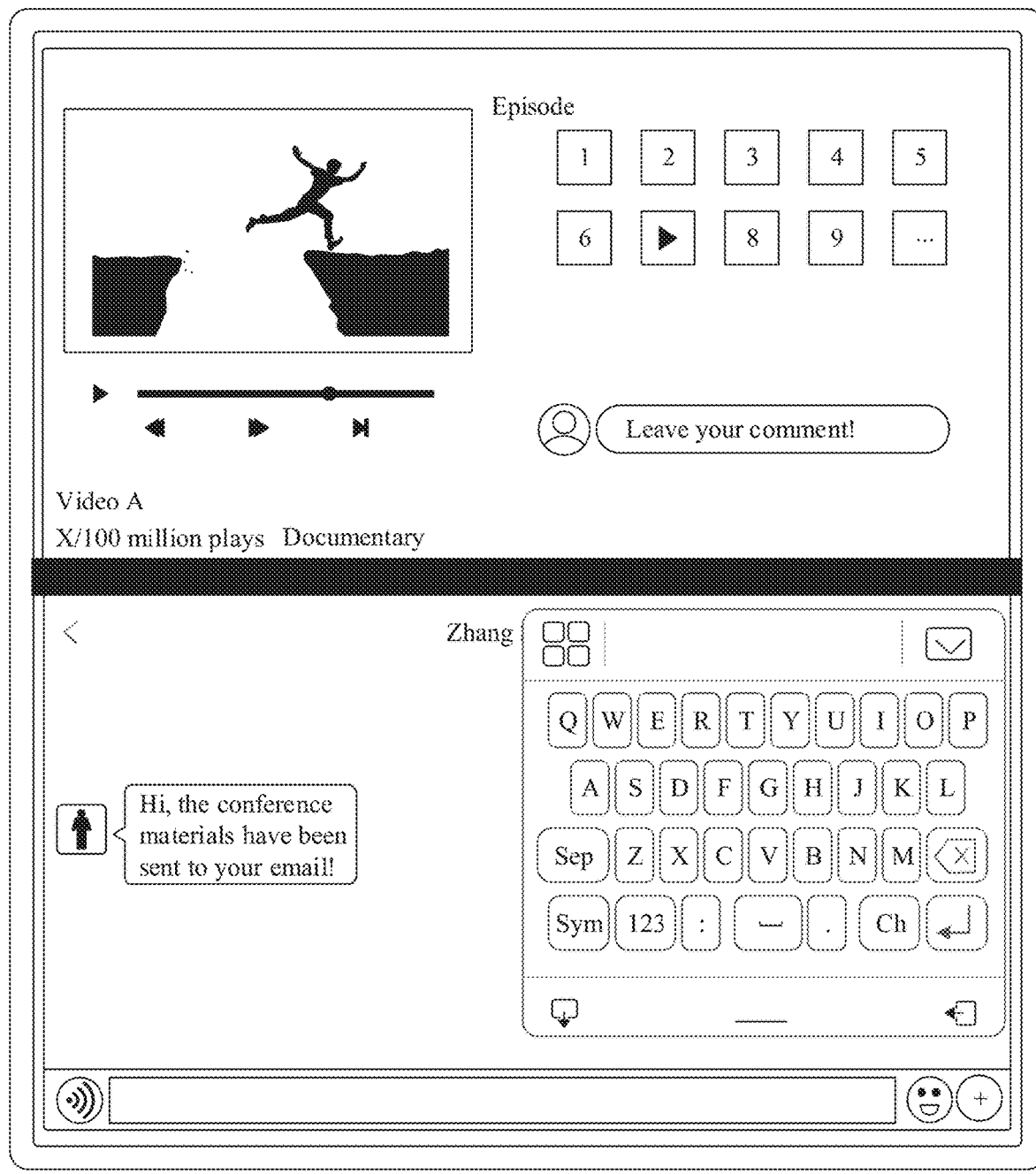
FIG. 27 is a schematic diagram of an example interface of displaying a keyboard region after the operation shown in FIG. 26 according to an embodiment of this application.

In some embodiments, when the foldable-screen device operates in the mode of a notebook computer, if interfaces of the two apps are displayed on a split-screen form, as shown in FIG. 26, the interface of the first app is displayed in the upper half of the screen, and the interface of the second app is displayed in the lower half of the screen. In addition, when the keyboard application is started, the keyboard region is displayed in a right region in the lower half of the screen, as shown in FIG. 27, to reduce obstruction of the screen while facilitating input of the user. In some embodiments, when the foldable-screen device operates in the mode of a notebook computer, reference may also be made to the manner of displaying the keyboard region in the horizontal split-screen interface in the foregoing embodiments. Details are not described herein again. It should be noted that when the foldable-screen device operates in the mode of a notebook computer, the interface of the floating window and the keyboard region may be displayed in the first region or the second region, and instead of being displayed across the first region and the second region. That is, an interface of a same app, or a same display region is not displayed in a region of the folding portion to avoid that the interface of the same app is displayed at a crease position of the foldable-screen device. Such a display manner is more appropriate.

The keyboard display method provided in this embodiment of this application may also be applied to a terminal device with a non-foldable screen, such as a tablet computer or a terminal device with another screen size. For implementation principles and technical effects thereof, refer to the descriptions of the foregoing embodiments.

Examples of the keyboard display method provided in this application are described above in detail. It may be understood that, to implement the foregoing functions, the corresponding apparatus includes a corresponding hardware structure and/or a software module that performs each function. A person skilled in the art should easily realize that, with reference to the examples described in embodiments disclosed in this specification, units and algorithm steps can be implemented in a form of hardware or a combination of hardware and computer software in this application. Whether a function is implemented in a manner of hardware or hardware driven by computer software depends on a specific application and a design constraint of a technical solution. A person skilled in the art may use different methods to implement the described functions for each specific application, but such implementation should not be considered to be beyond the scope of this application.

In this application, function module division may be performed on a keyboard display apparatus according to the foregoing method example. For example, function modules may be obtained through division based on functions, or two or more functions may be integrated into one module. The integrated module may be implemented in a form of hardware, or may be implemented in a form of a software function module. It should be noted that the module division in this application is an example, and is merely logical function division and may be other division in actual implementation.

Figure 28:
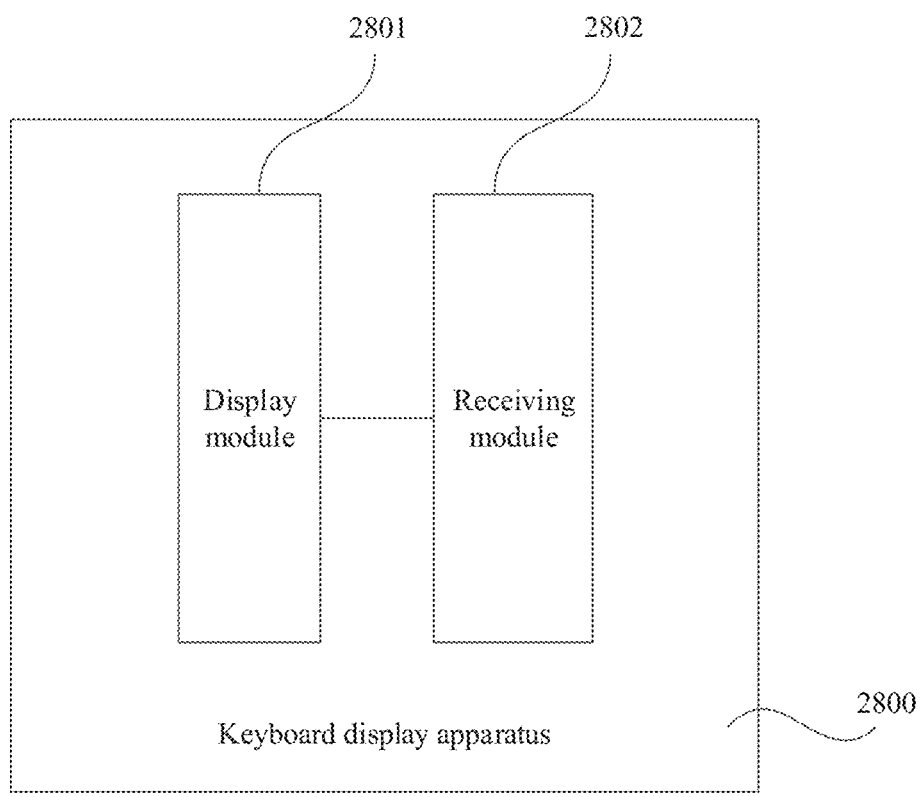
FIG. 28 is a schematic diagram of a structure of an example keyboard display apparatus according to an embodiment of this application.

FIG. 28 is a schematic diagram of a structure of a keyboard display apparatus 2800 according to this application. The apparatus 2800 includes a display module 2801 and a receiving module 2802.

The display module 2801 is configured to display a first interface, where the first interface includes a first region and a second region, the first region is used to display an interface of a first app, the second region is used to display an interface of a second app, the first region includes a first input box of the first app, and the second region includes a second input box of the second app.

The receiving module 2802 is configured to: when the first region and the second region are distributed from left to right, receive a first operation performed by a user on the first input box, where the first operation is used to determine that an input cursor is located in the first input box.

The display module 2801 is further configured to display a keyboard region in the first region in response to the first operation.

The receiving module 2802 is further configured to receive a second operation performed by the user on the second input box, where the second operation is used to determine that the input cursor is located in the second input box.

The display module 2801 is further configured to: in response to the second operation, display the keyboard region in the second region, and stop displaying the keyboard region in the first region.

Optionally, the receiving module 2802 is further configured to receive a third operation performed by the user on a third app, where the third operation is used to open the third app.

The display module 2801 is further configured to display the third region in the form of a floating window in response to the third operation, where the third region is used to display an interface of the third app, and the third region includes a third input box of the third app.

The receiving module 2802 is further configured to receive a fourth operation performed on the third input box, where the fourth operation is used to determine that the input cursor is located in the third input box.

The display module 2801 is further configured to display the keyboard region in the form of a floating window in response to the fourth operation.

Optionally, when the third region is located on an upper position of the second region, the keyboard region is vertically adjacent to the third region and the keyboard region is located on a lower position of the second region.

Optionally, the display module 2801 is further configured to: when the foldable-screen device satisfies a preset condition, display a second interface, where the second interface includes the first region and the second region, and the preset condition is a condition of satisfying horizontal split-screen display of the first app and the second app.

The receiving module 2802 is further configured to: when the first region and the second region are distributed from top to bottom, receive a fifth operation performed by the user on the first input box, where the fifth operation is used to determine that the input cursor is located in the first input box.

The display module 2801 is further configured to display the keyboard region in the second region in response to the fifth operation.

The receiving module 2802 is further configured to receive a sixth operation performed by the user on the second input box, where the sixth operation is used to determine that the input cursor is located in the second input box.

The display module 2801 is further configured to: in response to the sixth operation, display the keyboard region in the second region, and stop displaying the keyboard region in the first region.

Optionally, the keyboard region is located on a right side of the second region.

Optionally, the receiving module 2802 is further configured to receive a seventh operation performed by the user on a third app, where the seventh operation is used to open the third app.

The display module 2801 is further configured to display the third region in the form of a floating window in response to the seventh operation, where the third region is used to display an interface of the third app, and the third region includes a third input box of the third app.

The receiving module 2802 is further configured to receive an eighth operation performed on the third input box, where the eighth operation is used to determine that the input cursor is located in the third input box.

The display module 2801 is further configured to display the keyboard region in the form of a floating window in response to the eighth operation.

Optionally, the first region is located on an upper position of the screen, and the second region is located on a lower position of the screen: when the third region is located on a right side of the first region, the keyboard region is vertically adjacent to the third region and the keyboard region is located on the right side of the second region.

Optionally, when the third region is located on a left side of the second region, the keyboard region is horizontally adjacent to the third region and the keyboard region is located on the right side of the second region.

Optionally, the display module 2801 is specifically configured to display a main interface, where the main interface includes an icon of the first app and an icon of the second app.

The receiving module 2802 is further configured to receive a ninth operation performed by the user on the first app, where the ninth operation is used to open the first app.

The receiving module 2802 is further configured to receive a tenth operation performed by the user, where the tenth operation is used to open a sidebar, a list of a plurality of apps is displayed on the sidebar, and the plurality of apps include the second app.

The receiving module 2802 is further configured to receive an eleventh operation performed by the user on the second app on the sidebar, where the eleventh operation is used to open the second app in a split-screen form.

The display module 2801 is specifically configured to display the first interface.

Optionally, the tenth operation is an operation of sliding from a side edge of the screen toward the middle of the screen and then pausing.

Optionally, the eleventh operation is an operation of dragging the icon of the second app from the sidebar to a left side of the screen or a right side of the screen.

Optionally, the first app is a video play app, and the interface of the first app is a video play interface.

Optionally, the first app is a conference app, and the interface of the first app is an interface of a participant attendance status.

Optionally, the second app is a chat app, and the interface of the second app is a chat interface.

Optionally, the second app is a payment app, and the interface of the second app is a payment interface.

Figure 29:
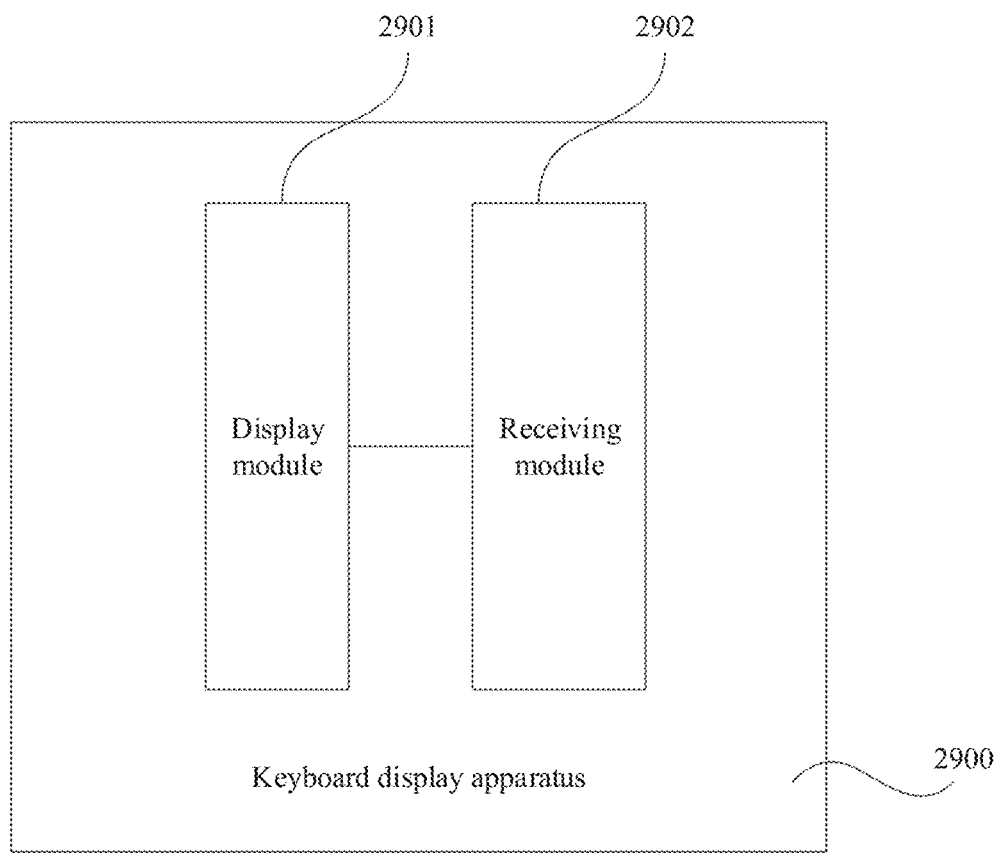
FIG. 29 is a schematic diagram of a structure of another example keyboard display apparatus according to an embodiment of this application.

FIG. 29 is a schematic diagram of a structure of another keyboard display apparatus 2900 according to this application. The apparatus 2900 includes a display module 2901 and a receiving module 2902.

The display module 2901 is configured to display a main interface, where the main interface includes an icon of a first app and an icon of a second app.

The receiving module 2902 is further configured to receive a ninth operation performed by a user on the first app, where the ninth operation is used to open the first app.

The receiving module 2902 is further configured to receive a tenth operation performed by the user, where the tenth operation is an operation of sliding from a side edge of a screen toward the middle of the screen and then pausing to open a sidebar, a list of a plurality of apps is displayed on the sidebar, and the plurality of apps include the second app.

The receiving module 2902 is further configured to receive an eleventh operation performed by the user on the second app on the sidebar, where the eleventh operation is an operation of dragging the icon of the second app from the sidebar to a left side of the screen or a right side of the screen.

The display module 2901 is further configured to display a first interface, where the first interface includes a first region and a second region, the first region is used to display an interface of the first app, the second region is used to display an interface of the second app, the first region includes a first input box of the first app, and the second region includes a second input box of the second app. When the first app is a video play app, the interface of the first app is a video play interface, or when the first app is a conference app, the interface of the first app is an interface of a participant attendance status. When the second app is a chat app, the interface of the second app is a chat interface, or when the second app is a payment app, the interface of the second app is a payment interface.

The receiving module 2902 is configured to: when the first region and the second region are distributed from left to right, receive a first operation performed by the user on the first input box, where the first operation is used to determine that an input cursor is located in the first input box.

The display module 2901 is further configured to display a keyboard region in the first region in response to the first operation.

The receiving module 2902 is further configured to receive a second operation performed by the user on the second input box, where the second operation is used to determine that the input cursor is located in the second input box.

The display module 2901 is further configured to: in response to the second operation, display the keyboard region in the second region, and stop displaying the keyboard region in the first region.

The receiving module 2902 is further configured to receive a third operation performed by the user on a third app, where the third operation is used to open the third app.

The display module 2901 is further configured to display the third region in the form of a floating window on an upper position of the second region in response to the third operation, where the third region is used to display an interface of the third app, and the third region includes a third input box of the third app.

The receiving module 2902 is further configured to receive a fourth operation performed on the third input box, where the fourth operation is used to determine that the input cursor is located in the third input box.

The display module 2901 is further configured to display the keyboard region in the form of a floating window on a lower position of the second region in response to the fourth operation, where the keyboard region is vertically adjacent to the third region.

The display module 2901 is further configured to: when the foldable-screen device satisfies a condition of horizontal split-screen display of the first app and the second app, display a second interface, where the second interface includes the first region and the second region.

The receiving module 2902 is further configured to: when the first region and the second region are distributed from top to bottom and the first region is located on the upper position of the second region, receive a fifth operation performed by the user on the first input box, where the fifth operation is used to determine that the input cursor is located in the first input box.

The display module 2901 is further configured to display the keyboard region on a right side of the second region in response to the fifth operation.

The receiving module 2902 is further configured to receive a sixth operation performed by the user on the second input box, where the sixth operation is used to determine that the input cursor is located in the second input box.

The display module 2901 is further configured to display the keyboard region on a right side of the second region in response to the sixth operation.

The receiving module 2902 is further configured to receive a seventh operation performed by the user on the third app, where the seventh operation is used to open the third app.

The display module 2901 is further configured to display the third region in the form of a floating window in response to the seventh operation.

The receiving module 2902 is further configured to receive an eighth operation performed on the third input box, where the eighth operation is used to determine that the input cursor is located in the third input box.

The display module 2901 is further configured to display the keyboard region in the form of a floating window in response to the eighth operation. When the third region is located on the right side of the first region, the key board region is vertically adjacent to the third region and the keyboard region is located on the right side of the second region. When the third region is located on a left side of the second region, the keyboard region is horizontally adjacent to the third region and the keyboard region is located on the right side of the second region.

For a specific manner in which the keyboard display apparatus performs the keyboard display method and a beneficial effect produced, refer to related descriptions in the method embodiments. Details are not described herein again.

An embodiment of this application further provides a foldable-screen device, includes the foregoing processor. The foldable-screen device provided in this embodiment may be the terminal device 100 shown in FIG. 1, and is configured to perform the foregoing keyboard display method. When an integrated unit is used, the foldable-screen device may include a processing module, a storage module, and a communication module. The processing module may be configured to control and manage actions of the foldable-screen device, for example, may be configured to support the foldable-screen device to perform the steps performed by a display unit, a detection unit, and a processing unit. The storage module may be configured to support the foldable-screen device to store program code, data, and the like. The communication module may be configured to support the communication between the foldable-screen device and another device.

In some embodiments, the foldable-screen device may perform the following method, including:

displaying a first interface, where the first interface includes a first region and a second region, the first region is used to display an interface of a first app, the second region is used to display an interface of a second app, the first region includes a first input box of the first app, and the second region includes a second input box of the second app;

when the first region and the second region are distributed from left to right, receiving a first operation performed by a user on the first input box, where the first operation is used to determine that an input cursor is located in the first input box;

displaying a keyboard region in the first region in response to the first operation;

receiving a second operation performed by the user on the second input box, where the second operation is used to determine that the input cursor is located in the second input box; and in response to the second operation, displaying the keyboard region in the second region, and stopping displaying the keyboard region in the first region.

Optionally, the foldable-screen device may further perform the following steps:

receiving a third operation performed by the user on a third app, where the third operation is used to open the third app;

displaying the third region in the form of a floating window in response to the third operation, where the third region is used to display an interface of the third app, and the third region includes a third input box of the third app;

receiving a fourth operation performed on the third input box, where the fourth operation is used to determine that the input cursor is located in the third input box; and displaying the keyboard region in the form of a floating window in response to the fourth operation.

Optionally, when the third region is located on an upper position of the second region, the key board region is vertically adjacent to the third region and the keyboard region is located on a lower position of the second region.

Optionally, the foldable-screen device may further perform the following steps:

when the foldable-screen device satisfies a preset condition, displaying a second interface, where the second interface includes the first region and the second region, and the preset condition is a condition of satisfying horizontal split-screen display of the first app and the second app;

when the first region and the second region are distributed from top to bottom, receiving a fifth operation performed by the user on the first input box, where the fifth operation is used to determine that the input cursor is located in the first input box;

displaying the keyboard region in the second region in response to the fifth operation;

receiving a sixth operation performed by the user on the second input box, where the sixth operation is used to determine that the input cursor is located in the second input box; and in response to the sixth operation, displaying the keyboard region in the second region, and stopping displaying the keyboard region in the first region.

Optionally, the keyboard region is located on a right side of the second region.

Optionally, the foldable-screen device may further perform the following steps:

receiving a seventh operation performed by the user on a third app, where the seventh operation is used to open the third app;

displaying the third region in the form of a floating window in response to the seventh operation, where the third region is used to display an interface of the third app, and the third region includes a third input box of the third app;

receiving an eighth operation performed on the third input box, where the eighth operation is used to determine that the input cursor is located in the third input box; and displaying the keyboard region in the form of a floating window in response to the eighth operation.

Optionally, the first region is located on an upper position of the screen, and the second region is located on a lower position of the screen; when the third region is located on a right side of the first region, the keyboard region is vertically adjacent to the third region and the keyboard region is located on the right side of the second region.

Optionally, when the third region is located on a left side of the second region, the keyboard region is horizontally adjacent to the third region and the keyboard region is located on the right side of the second region.

Optionally, the foldable-screen device may further perform the following steps:

displaying a main interface, where the main interface includes an icon of the first app and an icon of the second app;

receiving a ninth operation performed by the user on the first app, where the ninth operation is used to open the first app;

receiving a tenth operation performed by the user, where the tenth operation is used to open a sidebar, a list of a plurality of apps is displayed on the sidebar, and the plurality of apps include the second app;

receiving an eleventh operation performed by the user on the second app on the sidebar, where the eleventh operation is used to open the second app in a split-screen form; and displaying the first interface.

Optionally, the tenth operation is an operation of sliding from a side edge of the screen toward the middle of the screen and then pausing.

Optionally, the eleventh operation is an operation of dragging the icon of the second app from the sidebar to a left side of the screen or a right side of the screen.

Optionally, the first app is a video play app, and the interface of the first app is a video play interface.

Optionally, the first app is a conference app, and the interface of the first app is an interface of a participant attendance status.

Optionally, the second app is a chat app, and the interface of the second app is a chat interface.

Optionally, the second app is a payment app, and the interface of the second app is a payment interface.

In some embodiments, the foldable-screen device may perform the following method, including:

displaying a main interface, where the main interface includes an icon of a first app and an icon of a second app;

receiving a ninth operation performed by a user on the first app, where the ninth operation is used to open the first app;

receiving a tenth operation performed by the user, where the tenth operation is an operation of sliding from a side edge of a screen toward the middle of the screen and then pausing to open a sidebar, a list of a plurality of apps is displayed on the sidebar, and the plurality of apps include the second app;

receiving an eleventh operation performed by the user on the second app on the sidebar, where the eleventh operation is an operation of dragging the icon of the second app from the sidebar to a left side of the screen or a right side of the screen;

displaying a first interface, where the first interface includes a first region and a second region, the first region is used to display an interface of the first app, the second region is used to display an interface of the second app, the first region includes a first input box of the first app, and the second region includes a second input box of the second app; when the first app is an app for playing a video, the interface of the first app is a video play interface, or when the first app is a conference app, the interface of the first app is an interface of a participant attendance status; and when the second app is a chat app, the interface of the second app is a chat interface, or when the second app is a payment app, the interface of the second app is a payment interface;

when the first region and the second region are distributed from left to right, receiving a first operation performed by the user on the first input box, where the first operation is used to determine that an input cursor is located in the first input box;

displaying a keyboard region in the first region in response to the first operation;

receiving a second operation performed by the user on the second input box, where the second operation is used to determine that the input cursor is located in the second input box; and in response to the second operation, displaying the keyboard region in the second region, and stopping displaying the keyboard region in the first region;

receiving a third operation performed by the user on a third app, where the third operation is used to open the third app;

displaying the third region in the form of a floating window on an upper position of the second region in response to the third operation, where the third region is used to display an interface of the third app, and the third region includes a third input box of the third app;

receiving a fourth operation performed on the third input box, where the fourth operation is used to determine that the input cursor is located in the third input box;

displaying the keyboard region in the form of a floating window on a lower position of the second region in response to the fourth operation, where the keyboard region is vertically adjacent to the third region;

when the foldable-screen device satisfies a condition of horizontal split-screen display of the first app and the second app, displaying a second interface, where the second interface includes the first region and the second region;

when the first region and the second region are distributed from top to bottom and the first region is located on the upper position of the second region, receiving a fifth operation performed by the user on the first input box, where the fifth operation is used to determine that the input cursor is located in the first input box;

displaying the keyboard region on a right side of the second region in response to the fifth operation;

receiving a sixth operation performed by the user on the second input box, where the sixth operation is used to determine that the input cursor is located in the second input box;

displaying the keyboard region on a right side of the second region in response to the sixth operation;

receiving a seventh operation performed by the user on the third app, where the seventh operation is used to open the third app;

displaying the third region in the form of a floating window in response to the seventh operation;

receiving an eighth operation performed on the third input box, where the eighth operation is used to determine that the input cursor is located in the third input box; and displaying the keyboard region in the form of a floating window in response to the eighth operation, where when the third region is located on the right side of the first region, the keyboard region is vertically adjacent to the third region and the keyboard region is located on the right side of the second region; or when the third region is located on a left side of the second region, the keyboard region is horizontally adjacent to the third region and the keyboard region is located on the right side of the second region.

The processing module may be a processor or a controller. The processing module may implement or execute various example logical blocks, modules, and circuits described with reference to content disclosed in this application. The processor may be a combination implementing a computing function, for example, a combination including one or more microprocessors, or a combination of a digital signal processor (digital signal processing, DSP) and a microprocessor. The storage module may be a memory. The communication module may be specifically a device that interacts with another foldable-screen device, such as a radio frequency circuit, a bluetooth chip, or a Wi-Fi chip.

In an embodiment, when the processing module is a processor and the storage module is a memory, the foldable-screen device in this embodiment may be a device having the structure shown in FIG. 1.

An embodiment of this application further provides a computer-readable storage medium. The computer-readable storage medium stores a computer program, and when the computer program is executed by a processor, the processor is enabled to perform the keyboard display method in any one of the foregoing embodiments.

An embodiment of this application further provides a computer program product. When the computer program product is run on a computer, the computer is enabled to perform the foregoing related steps, so as to implement the keyboard display method in the foregoing embodiment.

The foldable-screen device, the computer-readable storage medium, the computer program product, or the chip provided in the embodiments is configured to perform a corresponding method provided above. Therefore, for beneficial effects that can be achieved by the foldable-screen device, the computer-readable storage medium, the computer program product, or the chip, refer to beneficial effects of the corresponding method provided above. Details are not described herein again.

In the several embodiments provided in this application, it should be understood that the disclosed apparatuses and methods may be implemented in another manner. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in different places. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and is sold or used as an independent product, the integrated unit may be stored in a readable storage medium. Based on such an understanding, the technical solutions in the embodiments of this application essentially, or the part contributing to the prior art, or all or a part of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: a medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A foldable-screen device, comprising:
a foldable screen;
at least one processor; and
one or more memories coupled to the at least one processor and storing programming instructions for execution by the at least one processor to cause the foldable-screen device to perform steps comprising:

displaying a first interface, wherein the first interface comprises a first region and a second region, the first region is used to display an interface of a first app, the second region is used to display an interface of a second app, the first region comprises a first input box of the first app, and the second region comprises a second input box of the second app;

when the first region and the second region are distributed from left to right, receiving a first operation performed by a user on the first input box, wherein the first operation is used to determine that an input cursor is located in the first input box;

displaying a keyboard region in the first region in response to the first operation;

receiving a second operation performed by the user on the second input box, wherein the second operation is used to determine that the input cursor is located in the second input box; and in response to the second operation, displaying the keyboard region in the second region, and stopping displaying the keyboard region in the first region;

receiving a third operation performed by the user on a third app, wherein the third operation is used to open the third app;

displaying a third region in the form of a floating window in response to the third operation, wherein the third region is used to display an interface of the third app, and the third region comprises a third input box of the third app; and receiving a fourth operation performed on the third input box, wherein the fourth operation is used to determine that the input cursor is located in the third input box; and displaying the keyboard region in the form of a floating window in response to the fourth operation;

when the third region is located on an upper position of the second region, the keyboard region is vertically adjacent to the third region and the keyboard region is located on a lower position of the second region.

2. The device according to claim 1, wherein the steps further comprise:

when the foldable-screen device satisfies a preset condition, displaying a second interface, wherein the second interface comprises the first region and the second region, and the preset condition is a condition of satisfying horizontal split-screen display of the first app and the second app;

when the first region and the second region are distributed from top to bottom, receiving a fifth operation performed by the user on the first input box, wherein the fifth operation is used to determine that the input cursor is located in the first input box;

displaying the keyboard region in the second region in response to the fifth operation;

receiving a sixth operation performed by the user on the second input box, wherein the sixth operation is used to determine that the input cursor is located in the second input box; and in response to the sixth operation, displaying the keyboard region in the second region.

3. The device according to claim 2, wherein the keyboard region is located on a right side of the second region.

4. The device according to claim 2, wherein the steps further comprise:

receiving a seventh operation performed by the user on a third app, wherein the seventh operation is used to open the third app;

displaying the third region in the form of a floating window in response to the seventh operation, wherein the third region is used to display an interface of the third app, and the third region comprises a third input box of the third app;

receiving an eighth operation performed on the third input box, wherein the eighth operation is used to determine that the input cursor is located in the third input box; and displaying the keyboard region in the form of a floating window in response to the eighth operation.

5. The device according to claim 3, wherein the steps further comprise:

receiving a seventh operation performed by the user on a third app, wherein the seventh operation is used to open the third app;

displaying the third region in the form of a floating window in response to the seventh operation, wherein the third region is used to display an interface of the third app, and the third region comprises a third input box of the third app;

receiving an eighth operation performed on the third input box, wherein the eighth operation is used to determine that the input cursor is located in the third input box; and displaying the keyboard region in the form of a floating window in response to the eighth operation.

6. The device according to claim 4, wherein the first region is located on an upper position of a screen, and the second region is located on a lower position of the screen; and when the third region is located on a right side of the first region, the keyboard region is vertically adjacent to the third region and the keyboard region is located on a right side of the second region.

7. The device according to claim 6, wherein when the third region is located on a left side of the second region, the keyboard region is horizontally adjacent to the third region and the keyboard region is located on the right side of the second region.

8. The device according to claim 1, wherein the displaying a first interface comprises:

displaying a main interface, wherein the main interface comprises an icon of the first app and an icon of the second app;

receiving a ninth operation performed by the user on the first app, wherein the ninth operation is used to open the first app;

receiving a tenth operation performed by the user, wherein the tenth operation is used to open a sidebar, a list of a plurality of apps is displayed on the sidebar, and the plurality of apps comprise the second app;

receiving an eleventh operation performed by the user on the second app on the sidebar, wherein the eleventh operation is used to open the second app in a split-screen form; and displaying the first interface.

9. The device according to claim 8, wherein the tenth operation is an operation of sliding from a side edge of the screen toward the middle of the screen and then pausing.

10. The device according to claim 8, wherein the eleventh operation is an operation of dragging the icon of the second app from the sidebar to a left side of the screen or a right side of the screen.

11. The device according to claim 9, wherein the eleventh operation is an operation of dragging the icon of the second app from the sidebar to a left side of the screen or a right side of the screen.

12. The device according to claim 1, wherein the first app is a video play app, and the interface of the first app is a video play interface.

13. The device according to claim 1, wherein the first app is a conference app, and the interface of the first app is an interface of a participant attendance status.

14. The device according to claim 1, wherein the second app is a chat app, and the interface of the second app is a chat interface.

15. The device according to claim 1, wherein the second app is a payment app, and the interface of the second app is a payment interface.

16. A keyboard display method, applied to a foldable-screen device and comprising:
    displaying a first interface, wherein the first interface comprises a first region and a second region, the first region is used to display an interface of a first app, the second region is used to display an interface of a second app, the first region comprises a first input box of the first app, and the second region comprises a second input box of the second app;
    when the first region and the second region are distributed from left to right, receiving a first operation performed by a user on the first input box, wherein the first operation is used to determine that an input cursor is located in the first input box;
    displaying a keyboard region in the first region in response to the first operation;
    receiving a second operation performed by the user on the second input box, wherein the second operation is used to determine that the input cursor is located in the second input box; and
    in response to the second operation, displaying the keyboard region in the second region, and stopping displaying the keyboard region in the first region;
    receiving a third operation performed by the user on a third app, wherein the third operation is used to open the third app;
    displaying a third region in the form of a floating window in response to the third operation, wherein the third region is used to display an interface of the third app, and the third region comprises a third input box of the third app; and
    receiving a fourth operation performed on the third input box, wherein the fourth operation is used to determine that the input cursor is located in the third input box; and
    displaying the keyboard region in the form of a floating window in response to the fourth operation;
    when the third region is located on an upper position of the second region, the keyboard region is vertically adjacent to the third region and the keyboard region is located on a lower position of the second region.

17. The method according to claim 16, wherein the method further comprises:
    when the foldable-screen device satisfies a preset condition, displaying a second interface, wherein the second interface comprises the first region and the second region, and the preset condition is a condition of satisfying horizontal split-screen display of the first app and the second app;
    when the first region and the second region are distributed from top to bottom, receiving a fifth operation performed by the user on the first input box, wherein the fifth operation is used to determine that the input cursor is located in the first input box;
    displaying the keyboard region in the second region in response to the fifth operation;
    receiving a sixth operation performed by the user on the second input box, wherein the sixth operation is used to determine that the input cursor is located in the second input box; and
    in response to the sixth operation, displaying the keyboard region in the second region.

18. The method according to claim 17, wherein the keyboard region is located on a right side of the second region.

19. The method according to claim 17, wherein the method further comprises:
    receiving a seventh operation performed by the user on a third app, wherein the seventh operation is used to open the third app;
    displaying the third region in the form of a floating window in response to the seventh operation, wherein the third region is used to display an interface of the third app, and the third region comprises a third input box of the third app;
    receiving an eighth operation performed on the third input box, wherein the eighth operation is used to determine that the input cursor is located in the third input box; and
    displaying the keyboard region in the form of a floating window in response to the eighth operation.

20. One or more non-transitory computer-readable media storing computer instructions, that when executed by one or more processors, cause a computing device to perform operations comprising:
    displaying a first interface, wherein the first interface comprises a first region and a second region, the first region is used to display an interface of a first app, the second region is used to display an interface of a second app, the first region comprises a first input box of the first app, and the second region comprises a second input box of the second app;
    when the first region and the second region are distributed from left to right, receiving a first operation performed by a user on the first input box, wherein the first operation is used to determine that an input cursor is located in the first input box;
    displaying a keyboard region in the first region in response to the first operation;
    receiving a second operation performed by the user on the second input box, wherein the second operation is used to determine that the input cursor is located in the second input box; and
    in response to the second operation, displaying the keyboard region in the second region, and stopping displaying the keyboard region in the first region;
    receiving a third operation performed by the user on a third app, wherein the third operation is used to open the third app;
    displaying a third region in the form of a floating window in response to the third operation, wherein the third region is used to display an interface of the third app, and the third region comprises a third input box of the third app; and
    receiving a fourth operation performed on the third input box, wherein the fourth operation is used to determine that the input cursor is located in the third input box; and
    displaying the keyboard region in the form of a floating window in response to the fourth operation;

when the third region is located on an upper position of the second region, the keyboard region is vertically adjacent to the third region and the keyboard region is located on a lower position of the second region.

* * * * *